(12) United States Patent  
Rohrberg et al.

(10) Patent No.: US 6,640,835 B1  
(45) Date of Patent: Nov. 4, 2003

(54) MICROMOUNT™ SYSTEM

(75) Inventors: Roderick G. Rohrberg, Torrance, CA (US); Timothy K. Rohrberg, Torrance, CA (US)

(73) Assignee: Creative Pathways, Inc., Torrance, CA (US)

( * ) Notice: Subject to any disclaimer, the term of this patent is extended or adjusted under 35 U.S.C. 154(b) by 0 days.

(21) Appl. No.: 10/040,913

(22) Filed: Jan. 9, 2002

Related U.S. Application Data

(63) Continuation-in-part of application No. 09/518,845, filed on Mar. 3, 2000.

(51) Int. Cl.[7] .............................................. F16K 11/10

(52) U.S. Cl. .................. 137/884; 285/125.1; 285/288.1

(58) Field of Search ................................. 137/269, 270, 137/884; 285/125.1, 129.1, 288.1, 329

(56) References Cited

U.S. PATENT DOCUMENTS

| | | | | | |
|---|---|---|---|---|---|
| 2,710,443 | A | * | 6/1955 | Webb | 29/890.043 |
| 5,983,933 | A | * | 11/1999 | Ohmi et al. | 137/597 |
| 5,988,217 | A | * | 11/1999 | Ohmi et al. | 137/614.2 |
| 6,039,360 | A | * | 3/2000 | Ohmi et al. | 285/61 |

* cited by examiner

*Primary Examiner*—John Fox  
(74) *Attorney, Agent, or Firm*—Thomas N. Giaccherini

(57) ABSTRACT

A MicroMount™ System for providing reliable, self-aligning connections to external fluid-handling or fluid-sensing components is disclosed. One embodiment comprises a generally miniaturized rectilinear body (102) that includes a plurality of exterior side walls (103). The upper wall (104) has a port (108) which is configured to connect to an external component. The end of the same port (108) which extends to the lower wall (105) is connected to an external passageway (107). The rectilinear body (102) does not require holes or fasteners that fit into holes, since it employs a number of posts (110) that project from the body (102) to secure the body (102) to an external component.

48 Claims, 37 Drawing Sheets

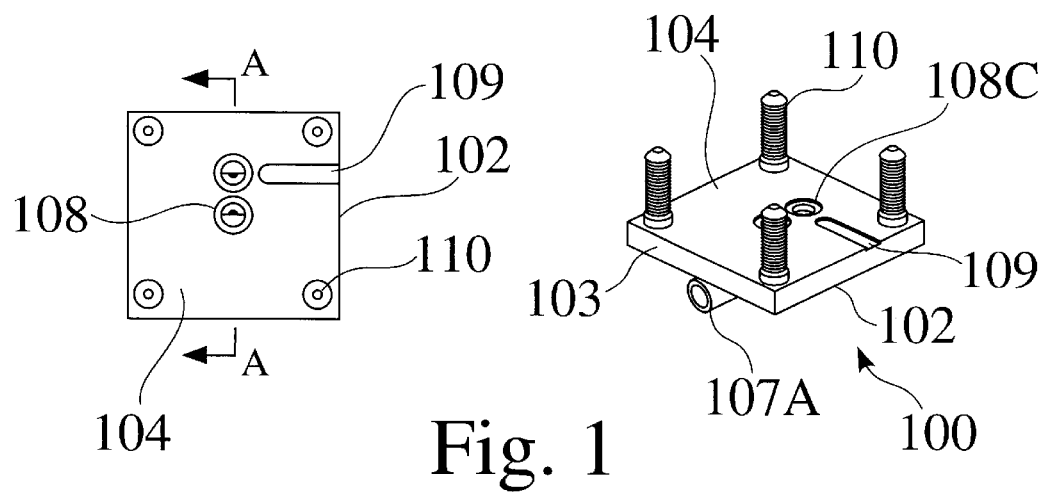
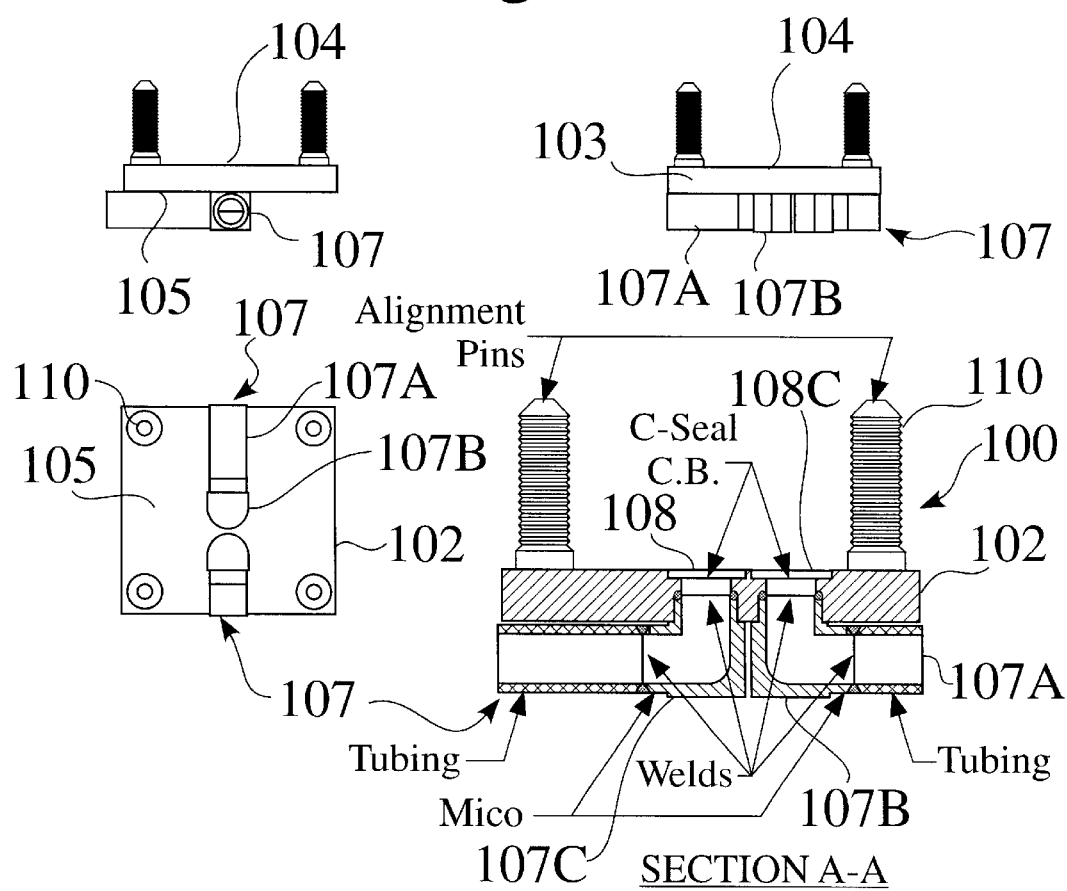
Fig. 1

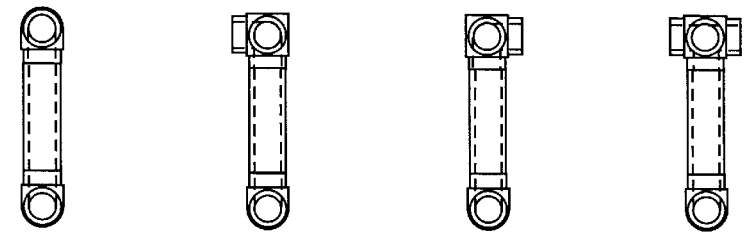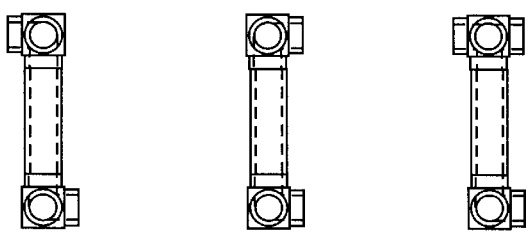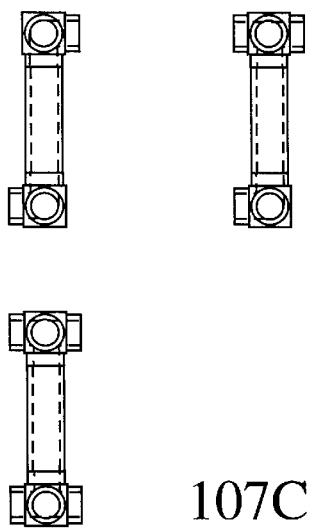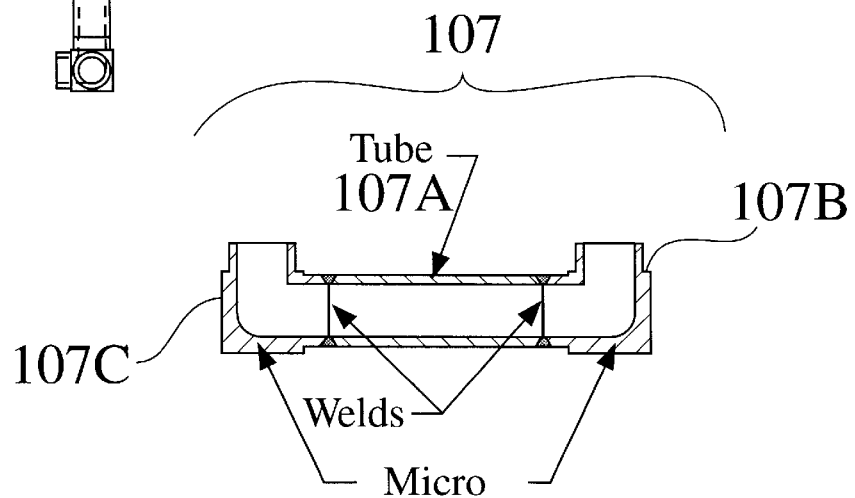
Fig. 3

Assembly

Fig. 7  Micro Assemblies

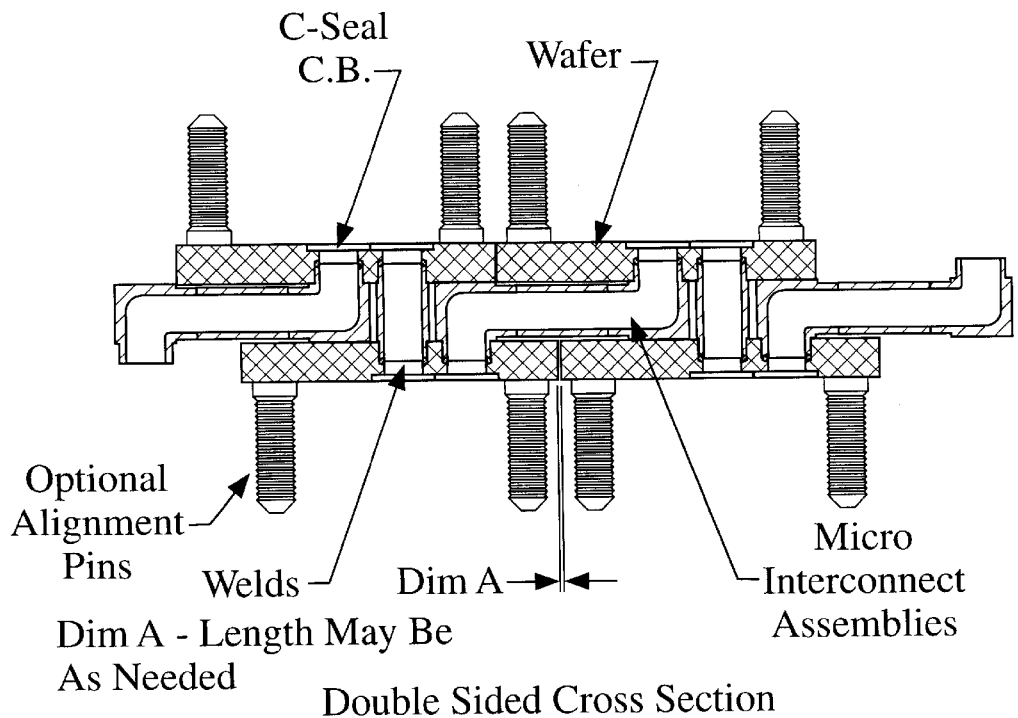
Double Sided Cross Section
Fig. 8
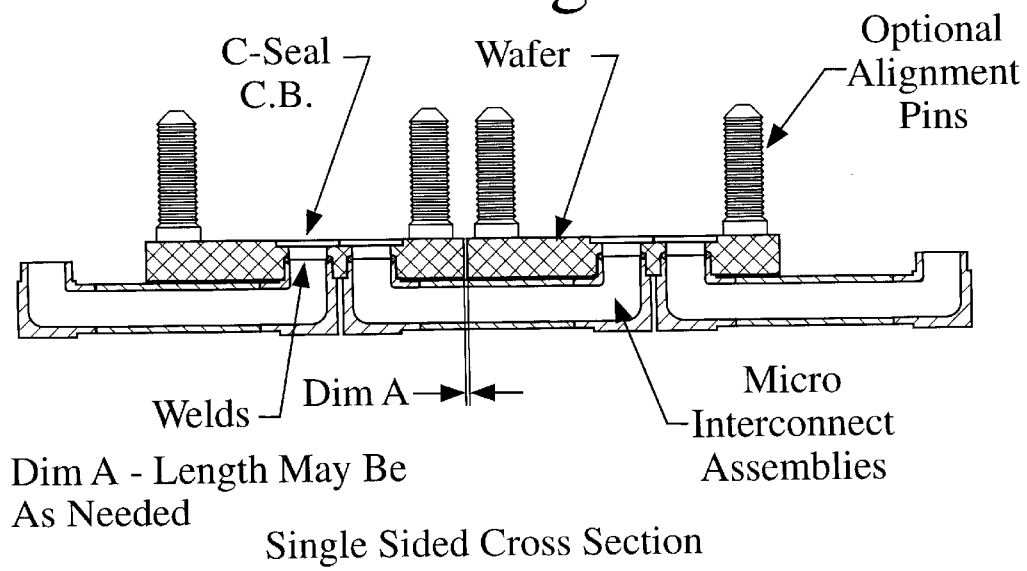
Single Sided Cross Section

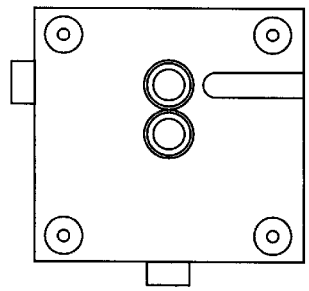 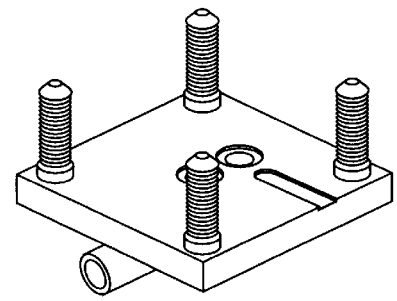
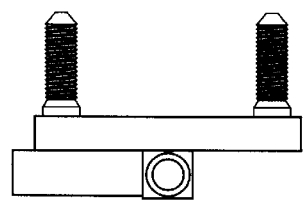 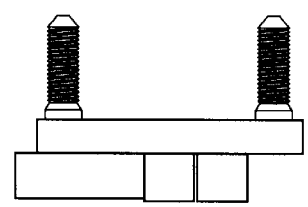
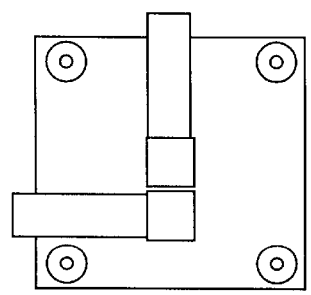
Fig. 10

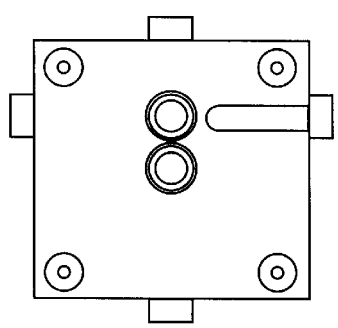 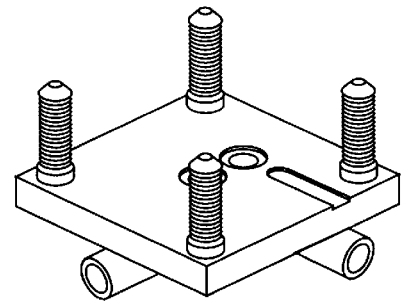
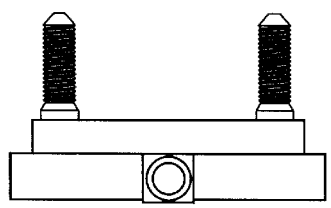 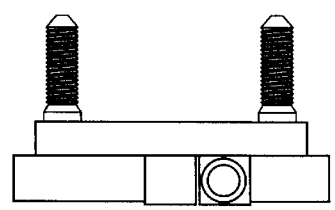
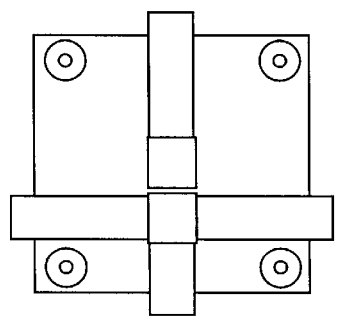
Fig. 11

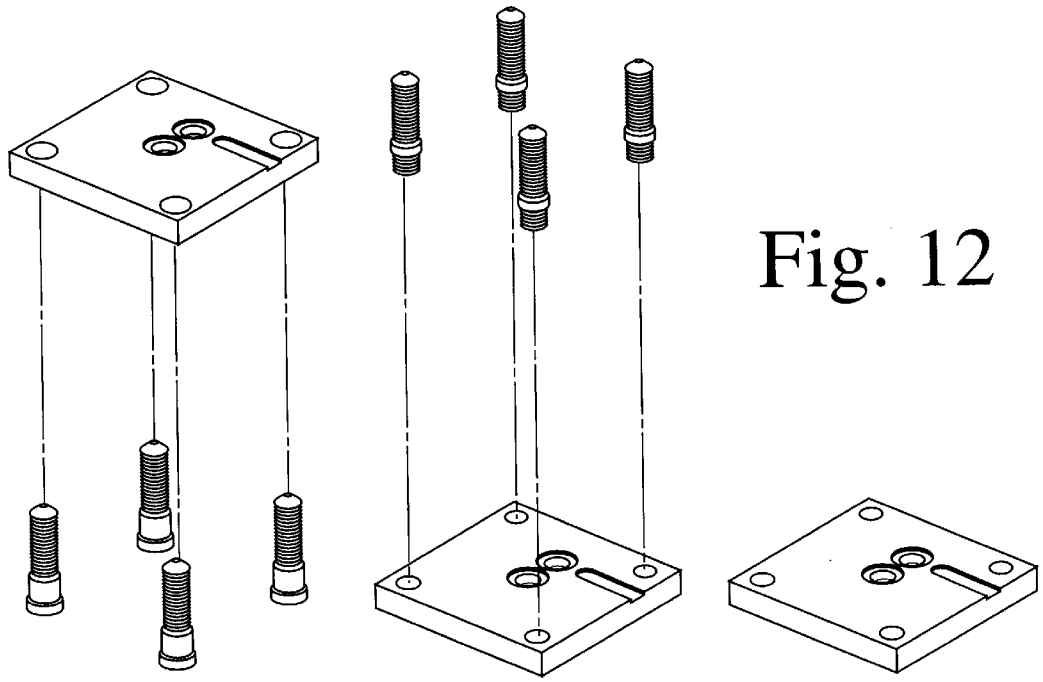
Fig. 12
-24
(Press-Fit)
-24
(Threaded)
-24
(Threaded)
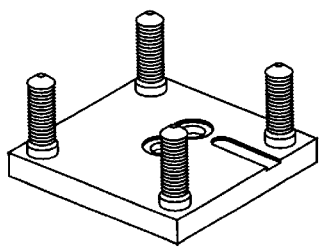
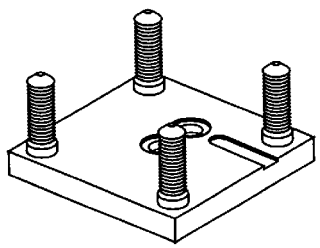
No Alignment Pins
Semi Spec. 2787.1
1.50 Inch Interface

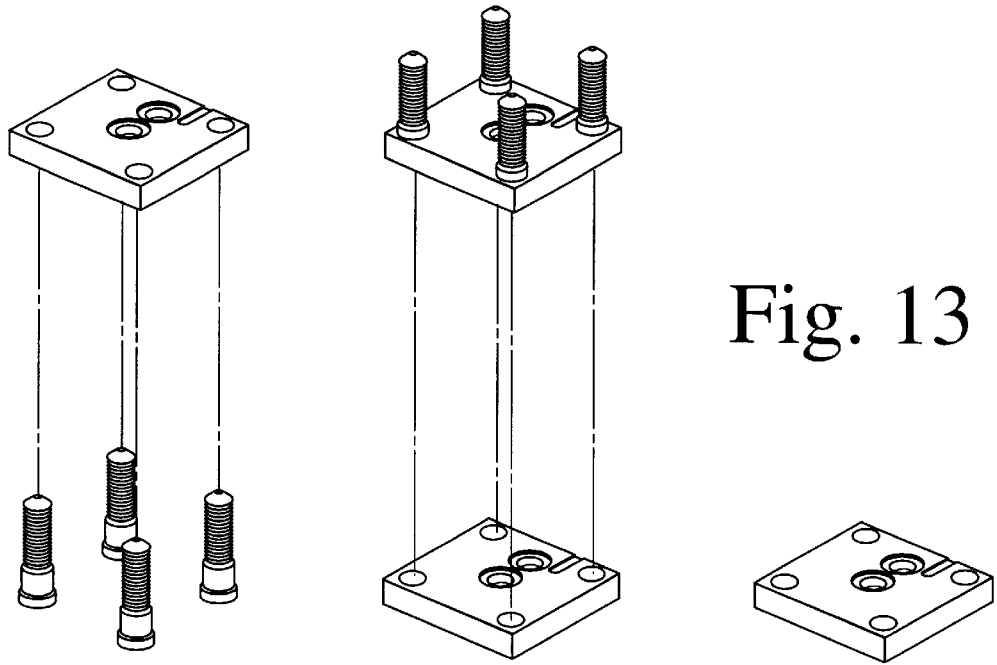
Fig. 13
(Press-Fit)  (Threaded)  (Threaded)
No Alignment
1.125 Inch Interface
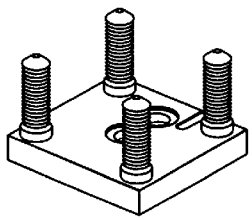
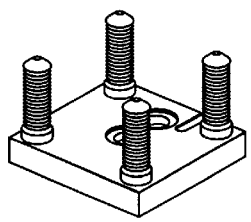

(Press-Fit or Threaded)  (Threaded)
No Alignment Pins

MICRO ELBOW

MICRO-FIT TEE

MICRO-FIT TRIBOW

MICRO-FIT TEEBOW

MICRO-FIT CROSSBOW

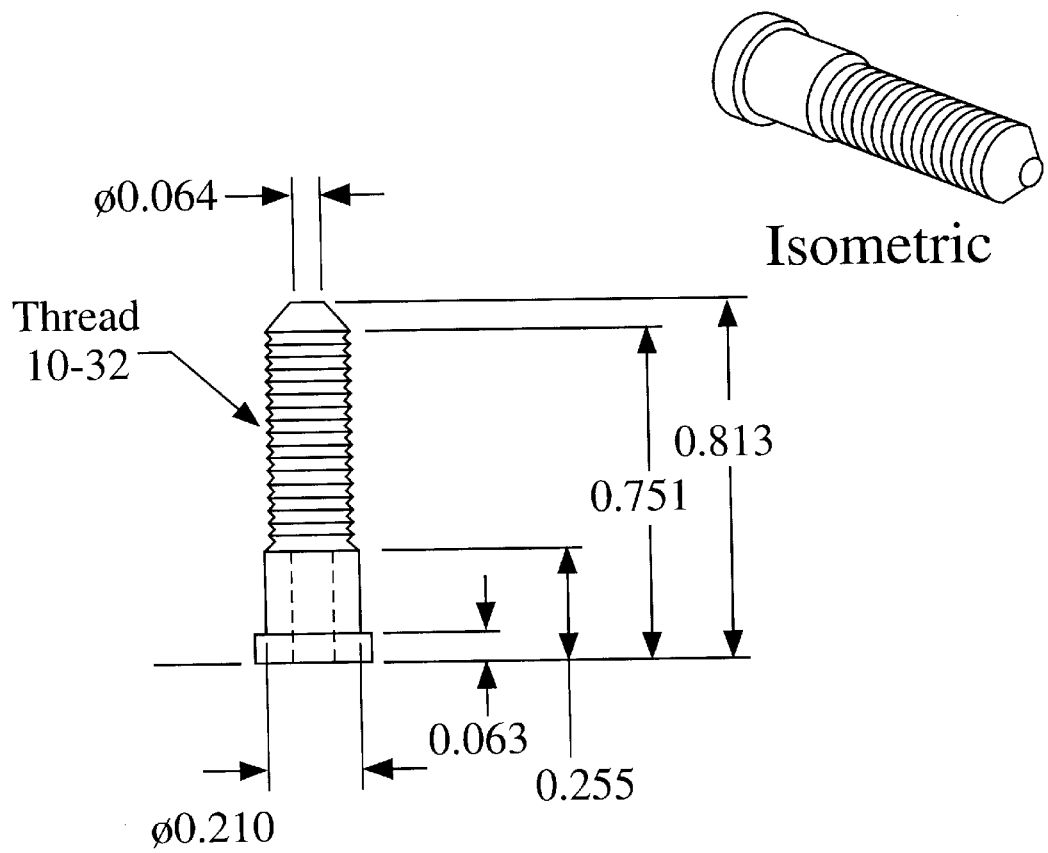
Fig. 20
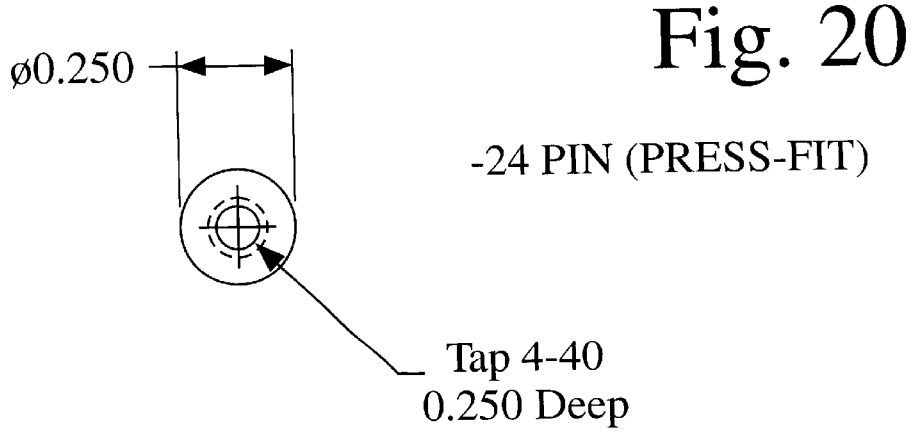
-24 PIN (PRESS-FIT)

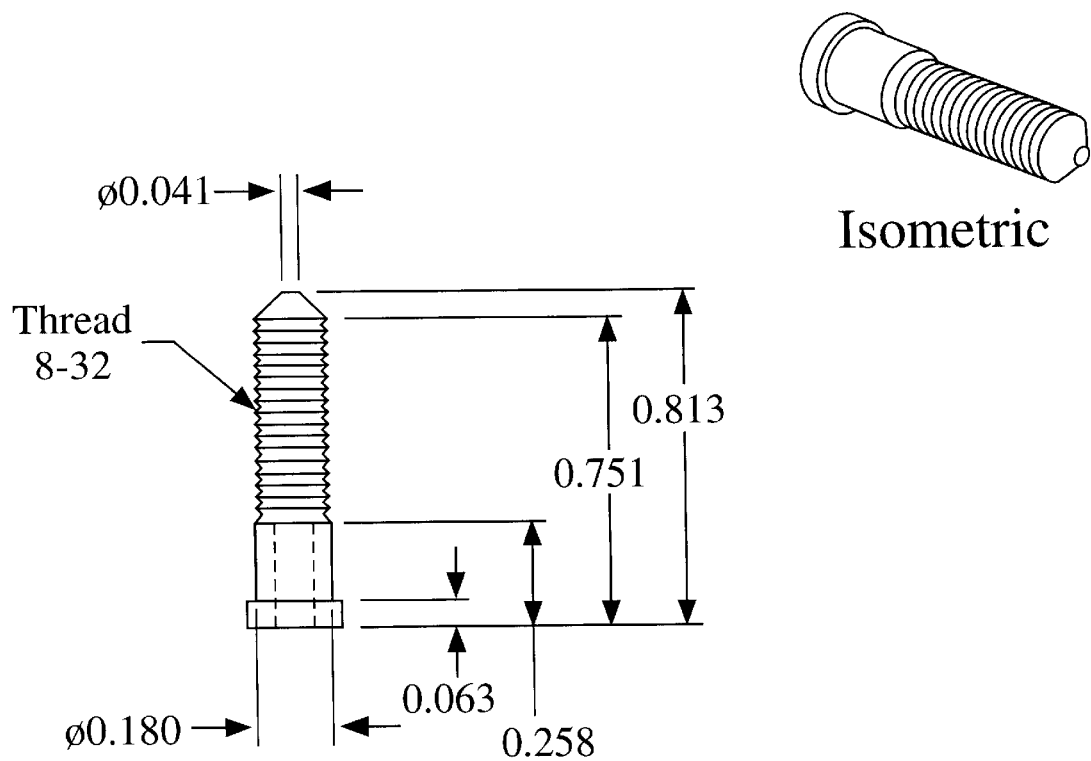
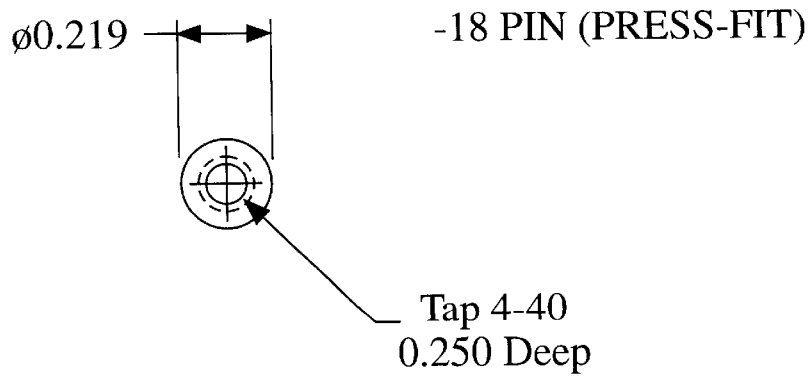
Fig. 21
-18 PIN (PRESS-FIT)

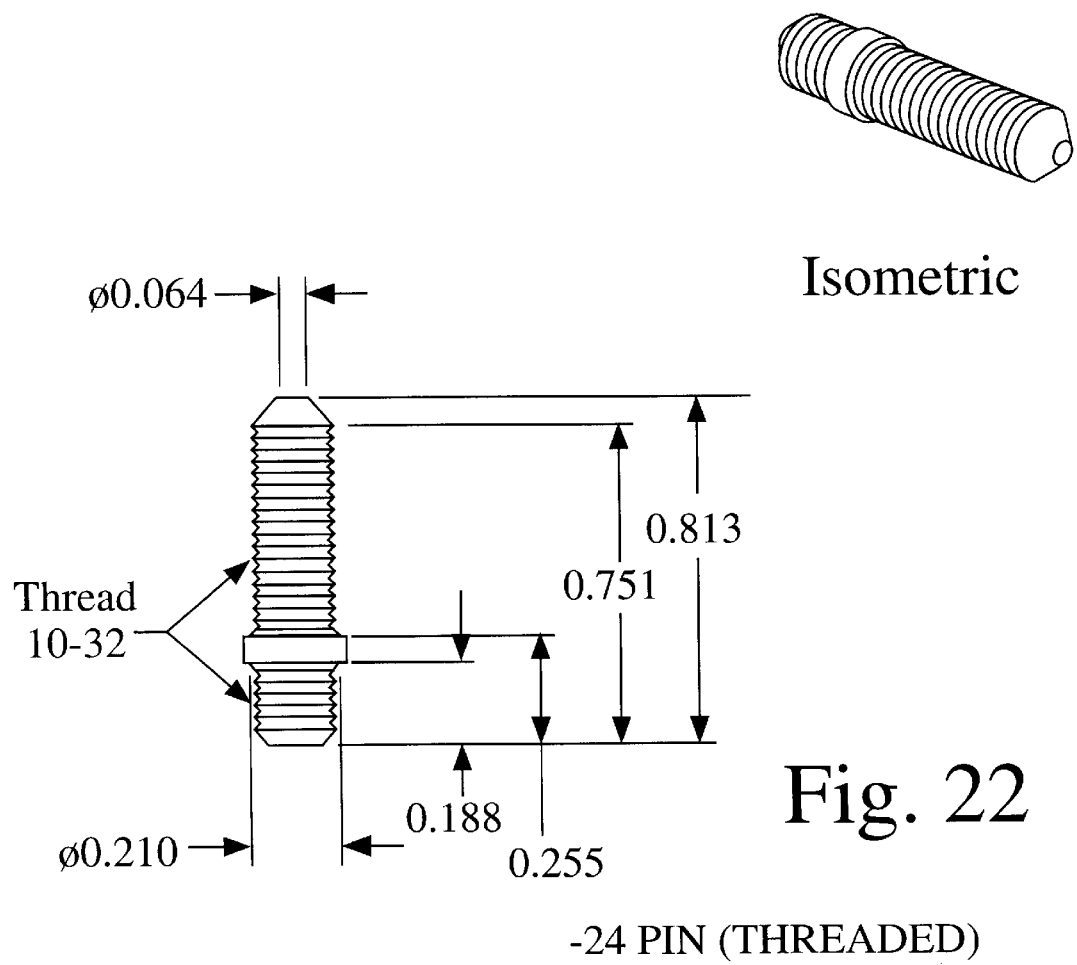
Fig. 22
-24 PIN (THREADED)

-18 PIN (THREADED)

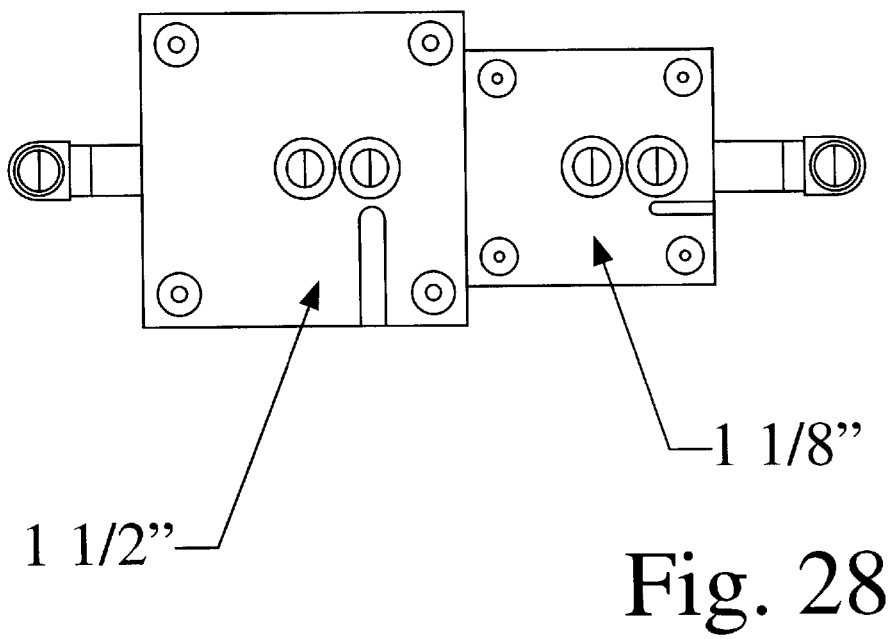
Fig. 28
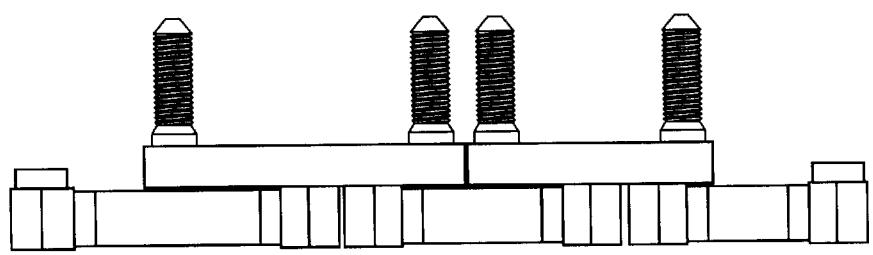
1 1/2 IN. AND 1.125 IN. MICROMOUNTS
DESIGNED IN COMMON SYSTEM Orifice can be Any Size & Length as Needed

MICROMATE™ INTERCONNECT SUB-ASSEMBLY

HEATER ELEMENT
MICROMATE INTERCONNECT

MICROMOUNT™ SYSTEM

CROSS-REFERENCES TO RELATED U.S. PATENT APPLICATIONS & U.S. PATENTS & CLAIMS FOR PRIORITY

The present Patent Application is a Continuation-in-Part Application. The Applicants claim the benefit of priority for any subject matter which is shared by the present Application, and by a parent Patent Application entitled High Precision Fluid Coupler which was filed on Mar. 3, 2000, and which was assigned U.S. Ser. No. 09/518,845. On Jun. 8, 2001, the Applicants filed a Request for a Continuing Prosecution Application for Ser. No. 09/518,845. A third pending U.S. Patent Application entitled Self-Aligning SmartStrate™, which was filed on Jul. 11, 2001, and which was assigned U.S. Ser. No. 09/903,869. A fourth pending U.S. Patent Application entitled MicroMount™ System, which was filed on Sep. 4, 2001, and which was assigned U.S. Ser. No. 09/952,313. The Applicants claim the benefit of priority for any subject matter which is commonly disclosed in the present Application and any of these pending Patent Applications.

The Invention described and claimed below is also related to earlier Inventions disclosed in U.S. Pat. No. 5,440,477 entitled Modular Bottle-Mounted Gas Management System by Roderick G. Rohrberg et al., issued on Aug. 8, 1995, and in U.S. Pat. No. 5,794,645 entitled Method for Supplying Industrial Gases Using Integrated Bottle Controllers by Roderick G. Rohrberg et al., issued on Aug. 18, 1998.

FEDERALLY SPONSORED RESEARCH OR DEVELOPMENT

None.

FIELD OF THE INVENTION

The present invention is a self-aligning miniaturized fluid coupling device for connecting fluid-handling components, tubes or devices. The MicroMount™ System may be employed to fabricate extremely versatile and reliable surface-mount assemblies or arrays of fluid-handling hardware.

BACKGROUND OF THE INVENTION

Many industries, including the semiconductor industry, use coupling hardware to connect gas lines and components in complex fabrication equipment. Previous connectors that have been incorporated into chip fabrication systems have served the needs of semiconductor manufacturers adequately, but at a high cost in terms of inconvenience and unacceptably high rates of failure. Conventional fluid fittings can be unreliable, especially if the seals which are used to join these fittings to other devices are misaligned or have been damaged due to improper installation. The high temperatures and pressures of the gases and liquids transported within these fittings and assemblies can eventually cause a breach of a seal, resulting in a leak that either contaminates the fluid within the line or in a dangerous loss of chemicals to the outside environment.

The Invention described and claimed below is related to earlier Inventions disclosed in U.S. Pat. No. 5,440,477 entitled Modular Bottle-Mounted Gas Management System by Roderick G. Rohrberg et al., issued on Aug. 8, 1995, and in U.S. Pat. No. 5,794,645 entitled Method for Supplying Industrial Gases Using Integrated Bottle Controllers by Roderick G. Rohrberg et al., issued on Aug. 18, 1998.

Previous attempts to provide fluid couplers and welding connectors have yielded mixed results. The Nupro Company of Willoughby, Ohio offers a variety of fittings identified by the Swagelok® Trade Mark. These fittings include substrates, manifold bases, end caps, bridges, surface-mounted diaphragms, bellows metering valves, seals and assembly hardware.

In U.S. Pat. No. 6,125,887, which was issued on Oct. 3, 2000 to James V. Pinto, discloses Welded Interconnection Modules for High Purity Fluid Flow Control Applications. Pinto generally claims "a rectangular metal modular block for directing fluid flow therethrough." (Preamble of claim 1, Column 5, Lines 30–31.) Pinto further recites limitations concerning a "pluarlity (sic) of holes receiving fasteners for securing said component to said block" (claim 1, Column 6, Lines 5–6) and a "plurality of holes receiving fasteners securing at least one said fluid control component to each said block" (claim 4, Column 6, Lines 20–22). Pinto's Claims require the inclusion of holes that have been pre-formed and tapped in the body of coupler. Pinto's Claims also require that these tapped holes receive separate fasteners which must be manually installed to connect the body of his device to a block or component. This manual installation is fraught with the risk of mis-aligning the fasteners, stripping their threads, damaging seals or producing a coupling to an external component which is not leak-proof.

Kinetics Group, Inc., of Santa Clara, Calif. sells conventional coupling hardware called K1S Modular Systems, including substrates and mounting, flange and manifold accessories. Information concerning these couplers may be viewed at www.kineticsgroup.com. Kinetics offers a flange accessory which generally comprises a body, a port and an integral tube stub that is connected to the port. This device is machined or milled from a single, solid piece of metal. The tube stub is a solid extension of the body, not a separate component, without any joints or seams between the tube and the body.

The shortcomings of conventional fluid couplers and gas control devices has presented a major challenge to designers in the field of industrial controls. The development of a self-aligning, surface-mount, miniaturized, safe, and clean fluid coupler would constitute a major technological advance. The enhanced performance that could be achieved using such an innovative device would satisfy a long felt need within the semiconductor fabrication and fluid handling industries.

SUMMARY OF THE INVENTION

The present invention, the MicroMount™ System, provides a radically new, self-aligning surface-mount fluid coupler. The MicroMount™ System comprises a wafer and a MicroMate™ Interconnection Assembly. A MicroMate™ Interconnection Assembly comprises a continuous, separate external tube and at least one MicroMate™ Fitting. An alternative embodiment of the MicroMount™ System also includes alignment studs which are used to connect the MicroMount™ System to an external component.

One preferred embodiment of the invention comprises a generally flat, rectilinear wafer, body or substrate having exterior side walls, an upper wall and a lower wall. In a preferred embodiment, one or more ports are formed in the upper and lower walls, and extend through the substrate. Unlike previous fluid couplers, the invention does not include side wall ports, external tube stubs or mechanical fasteners to join substrate to substrate for welding. The lower ends of each of these transverse ports may each be connected to an external passageway. This external passageway comprises a continuous tube which is completely external to the wafer, and which is about the same size as the port. The tube may be connected to one or more MicroMate™ fittings. The combination of the external passageway and MicroMate™ fittings is referred to as a MicroMate™ Interconnection Assembly. These fittings may include an elbow, a tee, a cross or some other configuration which guides and contains a fluid.

In a preferred embodiment, the wafer also includes four pre-formed, self-aligning pins or posts that may be used to connect an external device, block or component to the body. A thin foil sheet that includes alignment holes and "C-seals" is installed between the wafer and the external device, which is secured in place by a set of retainers that engage the posts.

In one embodiment of the invention, the seal is first installed by aligning the four holes in the sheet bearing the seal with the alignment posts that extend from the body of the wafer. The foil sheet serves as a "seal positioner" which holds the seals in the proper location. The seal is properly aligned when the tapered ends of the posts are inserted through the alignment holes in the foil sheet. By holding the seal in the correct alignment and location, the seal-positioning foil avoids any unwanted motion, deflection or translation of the seal. Once the seal is properly installed by sliding the seal all the way down so that the seal is in contact with the upper wall of the wafer, the alignment posts are mated with a corresponding set of holes on an external component. Finally, a set of retainers such as nuts may be used to secure the external component to the fluid coupler.

Due to the novel design of the present invention, the correct alignment of the coupler, the seal and the external component does not depend on the skill of the assembler, since no separate screws or fasteners are required to manually mount an external component on the wafer. The integrity of the seal and the physical connection between the body or wafer and the external component are assured by this self-aligning feature. The present invention provides quality assurance, along with simplicity in installation, and provides for the automatic registration and alignment of the body and the external component.

An appreciation of other aims and objects of the present invention and a more complete and comprehensive understanding of this invention may be achieved by studying the following description of a preferred embodiment, and by referring to the accompanying drawings.

A BRIEF DESCRIPTION OF THE DRAWINGS

FIG. 1 reveals isometric and cross-sectional views of one of the preferred embodiments of the invention, the MicroMount™ System.

FIG. 2 presents overhead and side views of a wafer.

FIG. 3 exhibits views of a MicroMate™ Interconnect Assemblies, which serve as external passageways for MicroMount™ Systems.

FIG. 4 supplies partial views of an assembly of MicroMounts™ and a MicroMate™ Interconnection Assembly.

FIG. 5 is a cross-sectional view showing MicroMate™ Interconnect Assemblies.

FIG. 6 furnishes top, side and bottom views of the same combination.

FIG. 7 supplies views of MicroMate™ sub-assemblies.

FIGS. 8 and 9 offer single-sided and double-sided cross sectional views of MicroMounts™ coupled to MicroMate™ Systems.

FIGS. 10, 11, 12 and 13 provide views of MicroMount™ Systems.

FIG. 14 reveals exploded views of MicroMounts™ with external components.

FIG. 15 supplies views of MicroMate™ elbows.

FIG. 16 supplies views of MicroMate™ tees.

FIG. 17 supplies views of MicroMate™ tribows.

FIG. 18 supplies views of MicroMate™ teebows.

FIG. 19 supplies views of MicroMate™ crossbows.

FIGS. 20 and 21 offer views of press-fit pins.

FIGS. 22 and 23 offer views of threaded pins.

FIGS. 24 and 25 reveal views of receptacles that accept press-fit pins.

FIG. 26 provides views of receptacles that accept threaded pins.

FIG. 27 offers a view of MicroMount™ Systems combined with a mass flow controller.

FIG. 28 supplies a view of two MicroMount™ Systems having different sizes.

FIG. 29 furnishes a view of a MicroMount™ System that has been configured as a flow restrictor.

FIG. 30 reveals yet another alternative embodiment of the invention, which includes heating elements.

FIG. 31 presents a view of two MicroMounts joined in an angular configuration.

FIG. 32 depicts optional joining methods.

FIG. 33 reveals additional details of the alignment stud and the wafer.

Figure 36:
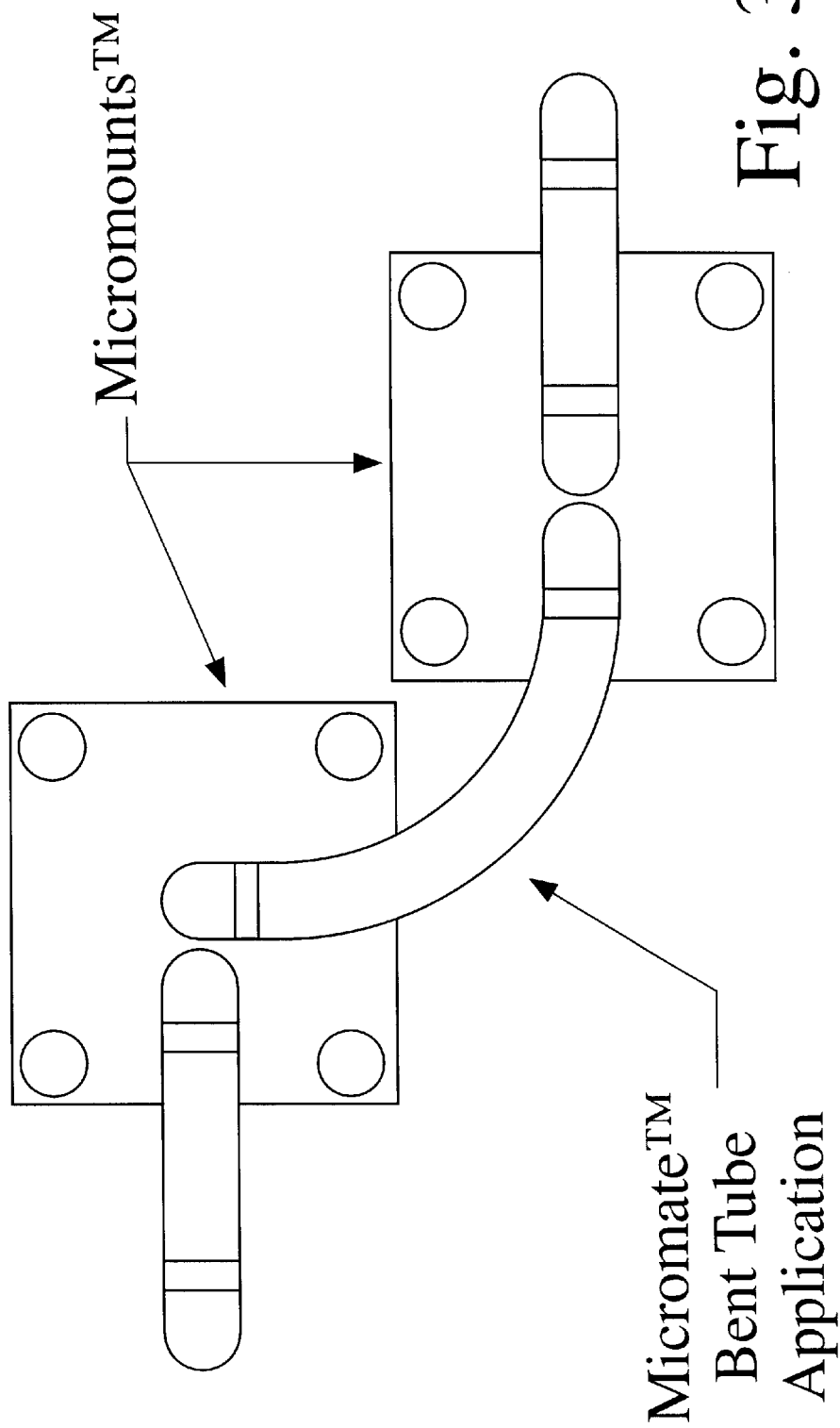

FIG. 36 reveals a combination of two MicroMounts connected by a bent tube.

Figure 37:
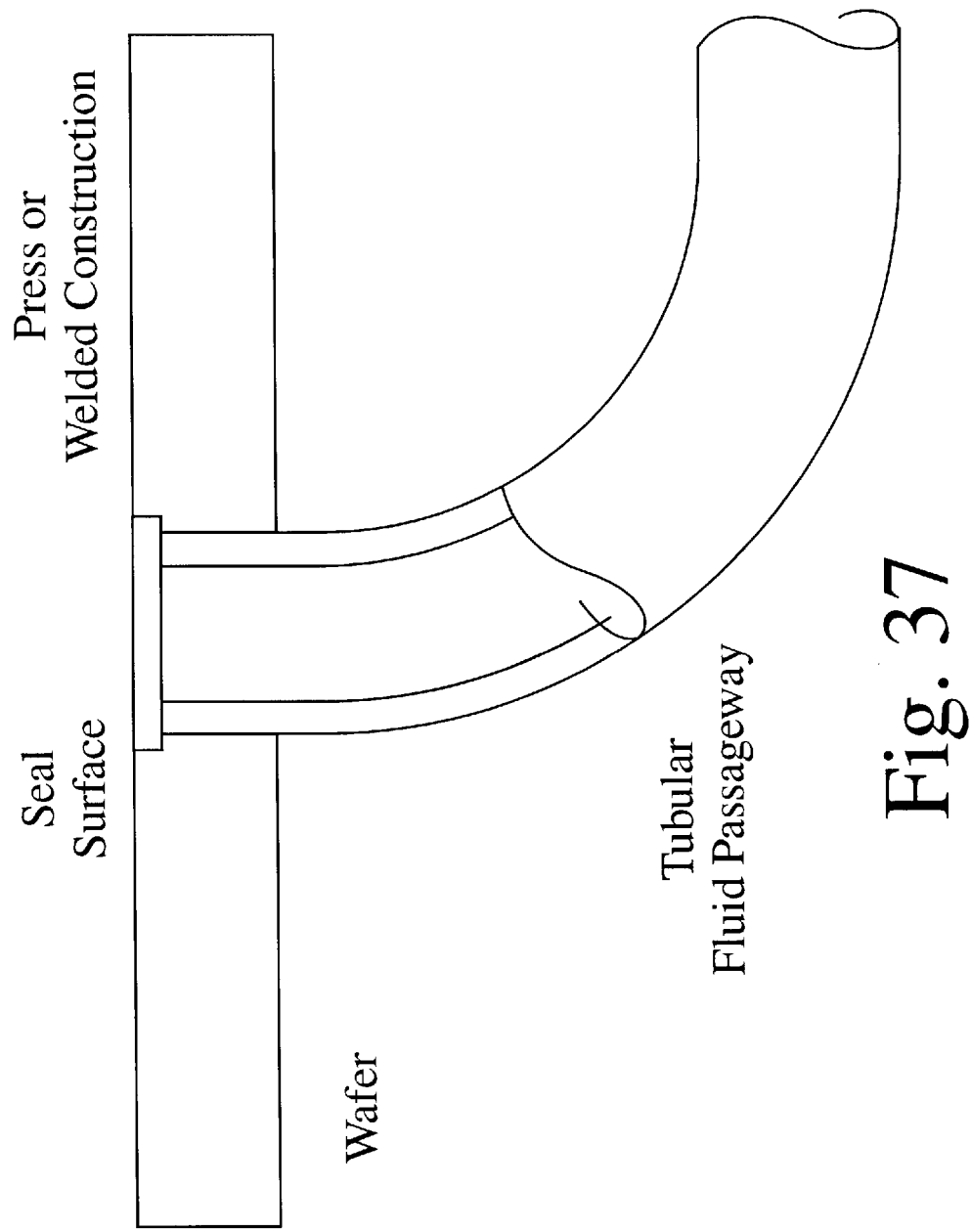

FIG. 37 provides a detailed view of a tubular fluid passageway.

A DETAILED DESCRIPTION OF PREFERRED & ALTERNATIVE EMBODIMENTS

I. A Preferred Embodiment of the Invention

FIG. 1 depicts a preferred embodiment of the MicroMount™ System 100. This embodiment comprises a generally rectilinear body or wafer 102 having four, generally parallel exterior side walls 103, an upper wall 104 and a lower wall 105. While the preferred embodiment is generally rectilinear, the body or wafer 102 may be formed in a variety of shapes or configuration, including circular or curved embodiments. Unlike conventional couplers, the exterior walls 103 do not include a side wall port or a weld extension for making connections to external lines.

In one preferred embodiment, a pair of ports 108 are formed in the body 102. These ports 108 extend transversely through the narrowest dimension of the wafer 102. Both ends of the transverse ports terminate in a counterbore 108C.

The port 108 on the lower wall 105 of the wafer is welded to an external passageway, which is generally referred to as a MicroMate™ Interconnection Assembly 107. This Assembly 107 generally comprises an external tube 107A which is welded to one or more MicroMate™ fittings 107B, 107C. Unlike other conventional couplers, the external tube 107A is a separate, continuous passageway which is welded to the wafer, as opposed to being an integral, machined part of a coupler block or body. The MicroMate™ fitting may comprise an elbow, a tee, a cross or some other configuration that is employed to conduct fluid from the port 108 on the underside of the wafer 102 to the external tube 107A.

The ports 108 that are located on upper wall 104 is used in a weldless connection to an external component. In one embodiment of the invention, the top surface 104 of the body 102 also includes a "sniffing hole" 109 which is used to detect leaks.

The external tube 107A offers several advantages and benefits when compared to other conventional couplers which incorporate internal passageways. The external tube 107A:

provides a universal "building block" for fluid-handling fittings;

offers an elegantly simple, straight-forward design;

reduces the manufacturing cost of the coupler, since the coupler no longer needs to be large enough to enclose an internal passageway;

adds versatility, since the tube may be configured to extend away from the wafer in any direction in a 180 degree angle;

reduces the space that is necessary for the fluid coupler compared to previous fluid-handling blocks; and allows for a stacked array of single or double sided MicroMounts™.

One embodiment of the present invention provides an elegantly simple machined component which offers a wide variety of design variations to meet the needs of virtually any fluid-handling application or manifold configuration. The substrates or bodies 102 may be placed any reasonable distance apart, or may touch. The substrate may be designed as an individual component, or may be integrated into a common plate. In one embodiment, the invention may utilize a one and one eighth inch or one and one half inch surface mount configuration. The invention may employ either single or double-sided mounting. The MicroMounts™ may be assembled into any desirable configuration by welding an external tube between adjacent MicroMounts™. The present invention eliminates the need for butt-welding druing assembly, as is required when using previous fluid-handling hardware. When compared to other devices currently on the market, the invention offers several advantages:

Overall design flexibility;

Miniaturized dimensions, footprint and volume;

Lower weight; and

Lower manufacturing cost.

The MicroMount™ is a universal component that may be modified or altered to fit nearly any fluid-handling system. The invention may be rotated in virtually any direction, which is not possible using previous couplers.

In an alternative embodiment, the invention may be used for other purposes than fluid conveyance. As an example, the invention may be employed to protect wires, or fibers or some other installed device in a hostile environment or in military equipment.

II. Self-Aligning Posts

In a preferred embodiment, the body 102 also includes four self-aligning posts 110 that may be used to connect an external device, block or component 116 to the body 102. A thin-foil sheet 112 that includes alignment holes 113 and "C-seals" 114 is installed between the body 102 and the external device 116, which is held in place by a set of retainers 118 which are secured to the posts 110. These sheets 112 are well-known in the commercial marketplace, and are sold by EG&G of Beltsville, Maryland under the trademarked name of "BETA-C™ Seal."

In a preferred embodiment of the invention, the pins 110 are integrally formed, machined or otherwise incorporated with the body 102, which eliminates the need for an end user to precisely align and then assemble the body 102 with an external set of fasteners. By obviating the need for assembly by the end user, the present invention provides an integrated coupler which virtually eliminates the risk of damage incurred by the end user due to a mis-aligned assembly or a scratched, scored or broken seal 114. The pins 110 also include tapered, rounded or conical ends 111 which enable the automatic alignment of the pins 110 with the sheet 112 and the external component 116. These projections 110 may be threaded or unthreaded, or may comprise a pin, post, stud or any other suitable protruding member that provides a means of connecting the body 102 to some other device, block or component. The retainers 118 may be a nut, cap or any other means which is capable of securing an external component to the body 102.

The foil sheet 112 which holds the seals 114 in place provides for the automatic registration and alignment of the body 102 and the external component. The seal 114 is properly aligned when the posts 110 are inserted through a set of alignment holes 113 that are generally located in the corners of the foil sheet 112. This correct alignment does not depend on the skill of the assembler, since no separate screws or fasteners are required to manually couple the body 102 to an external component. The integrity of the seal 114 and the physical connection between the body 102 and the external component are assured by this self-aligning feature. The semiconductor industry, one of the largest users of the present invention, is extremely concerned about the integrity of this seal 114. Small radial scratches on the surface of the seal 114 could compromise the ability of the seal to prevent leaks. Any rough handling or abrasion of the seal could result in a scratch which ruins the coupling between the body 102 and the external component 116.

The self-alignment pins 110 offer several benefits. The posts or pins 110:

Permit visual positioning of the foil sheet 112 or the positioning of individual seals 114;

Insure the precise alignment of the external surface mount component over the seals 114;

Eliminate the potential for damage to the seal 114 due to an assembly error by preventing the seal from being scratched at the point of engagement with the pins;

Capture the external surface mount component and align it before the external component comes into contact with the seals 114; and Provide, in one embodiment, a 0.210 diameter engagement with the external component.

The pins 110 that are incorporated into single sided substrates may employ slightly larger "bottom-end" diameters for those who prefer additional security.

Once the external component is placed on the body, it is restrained from lateral or rotational movement. At this point, the nuts may be readily engaged with the pins. The nut design is very simple, and can be modified to suit any external component.

The wrenching configuration is also readily changed. The motivation for this self-aligning feature is to provide quality assurance, along with simplicity in installation.

In yet another embodiment of the invention, the alignment posts 110 are modified to include grooves 115 which are capable of retaining a sheet 112 bearing a seal 114. This embodiment allows the fluid coupler to be shipped to a customer or end-user with the seal 114 already corrected installed on the top wall 104 of the body 102 of the fluid coupler.

The present invention may be utilized or combined with virtually any suitable external component which may or may not be a surface mount component. Examples of an external component include a manual valve, a pneumatic valve, a solenoid valve, a pressure regulator, a pressure transducer, a filter, a purifier or a mass flow controller. In most cases, the external component that is used with the present invention is characterized by dimensions which are standardized. In some circumstances, the body 102 may act as a heat sink during welding. In accordance with the invention, the combined body 102 and external component are generally leak-proof means for providing a high purity conveyance for fluids. In a preferred embodiment, the present invention is configured to be compatible with SEMI-standard formats.

III. Other Alternative Embodiments of the Invention

Figure 2:
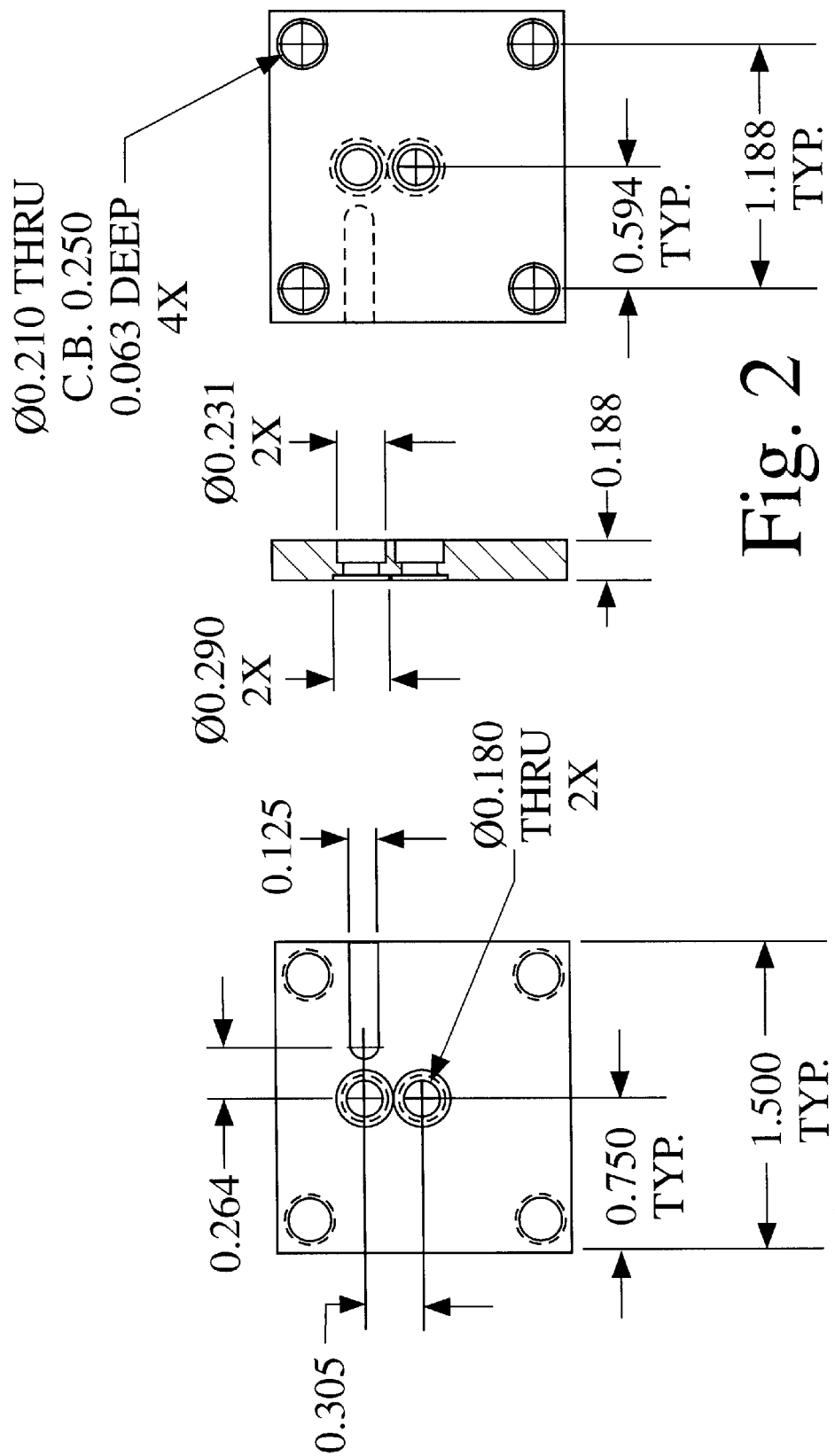

FIG. 2 depicts overhead and side views of the body, wafer or substrate 102. This portion of the invention serves as a universal receptacle for both the external component, which is attached to the top side of the wafer; and for the MicroMate Interconnection Assembly, which is attached to the underside of the wafer.

FIG. 3 exhibits views of MicroMate™ Interconnection Assemblies 107, which serve as external passageways for MicroMounts™. These Assemblies generally comprise a single external tube 107A, and one or more MicroMates 107B, 107C. In a preferred embodiment of the invention, the metal tubes and MicroMates are welded together. The resulting assembly is then welded to a port 108 on the wafer 102. In an alternative embodiment, the metal tubes and MicroMates may be made from a material like plastic, and then joined with a glue or other binding agent.

Figure 4:
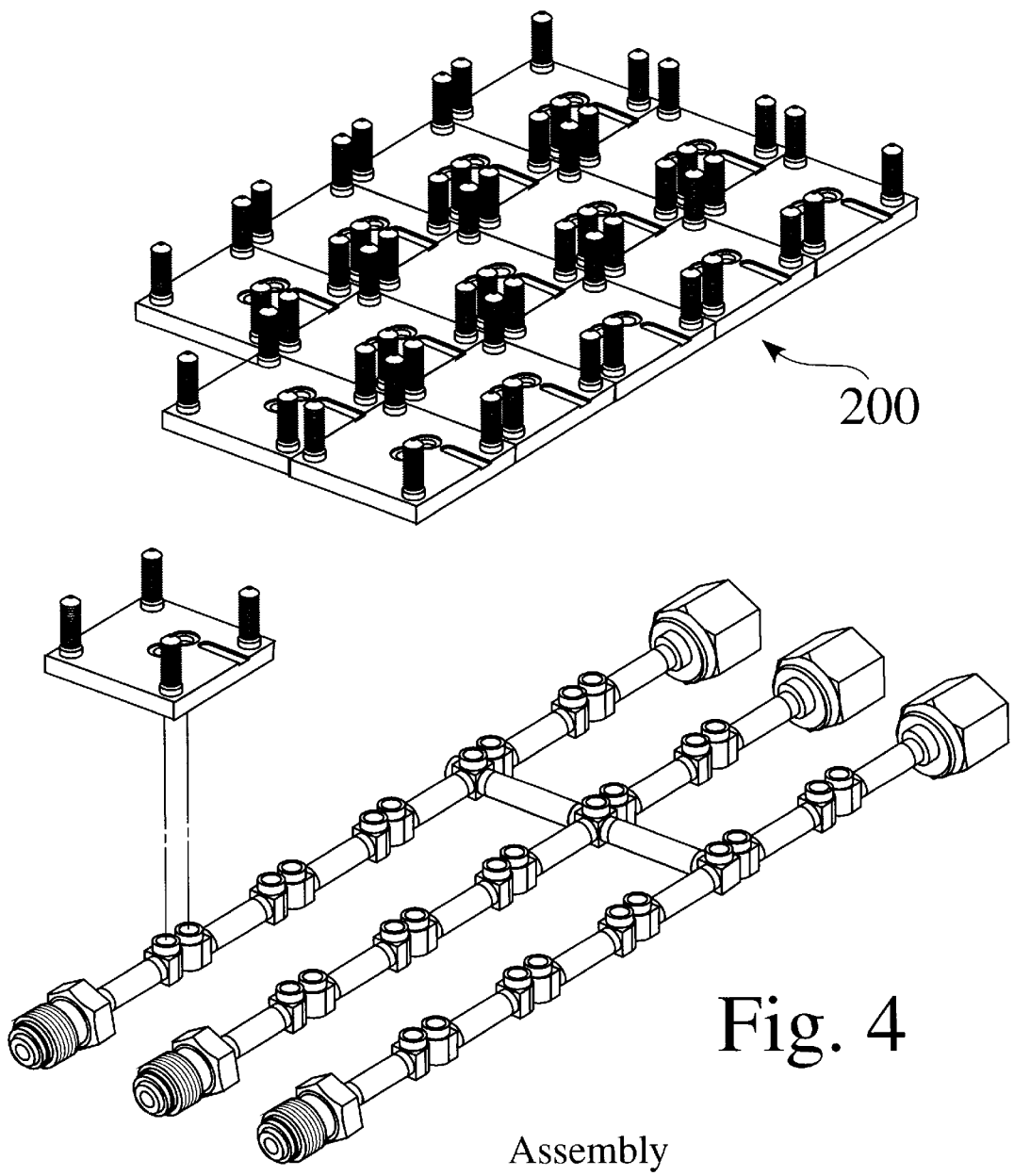
Figure 5:
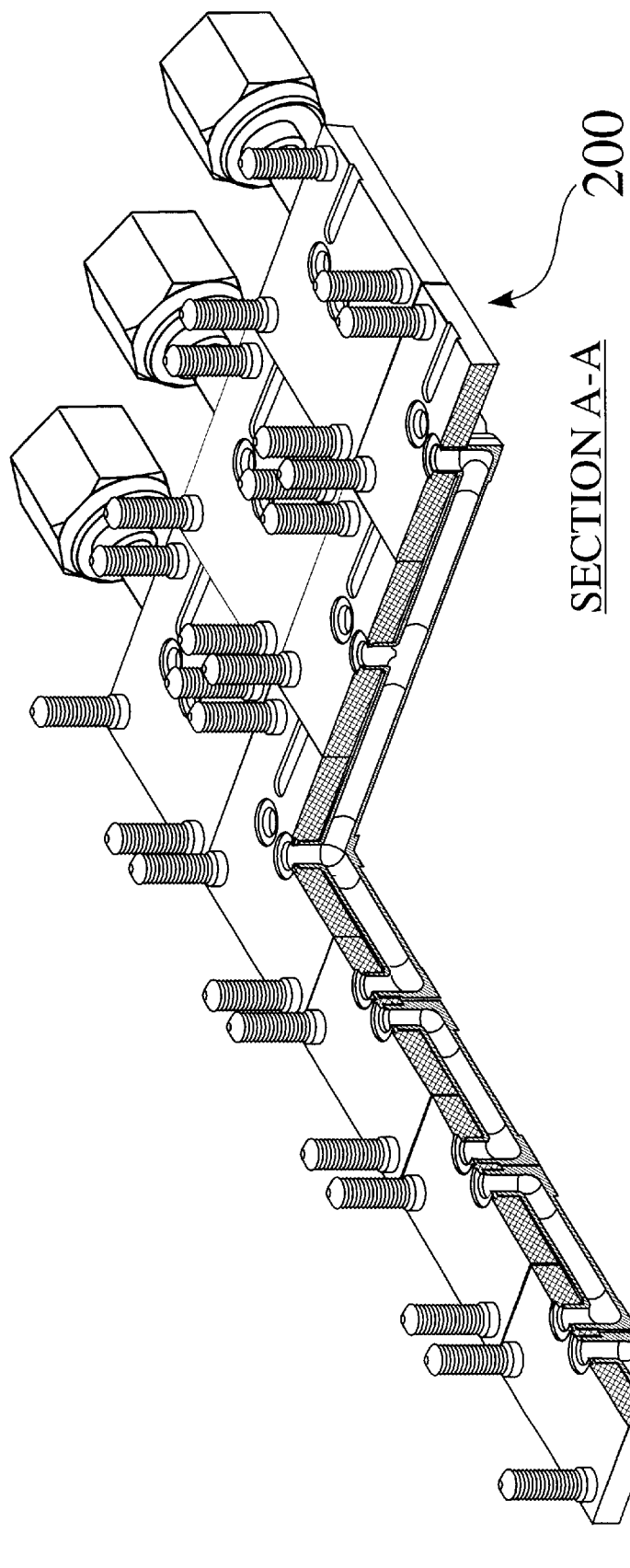

FIG. 4 supplies views of an assembly of MicroMounts™ and an assembly of MicroMates™. Due to the small size and volume of the wafers, complex arrays of parallel planes of MicroMounts™ may be constructed, as shown in FIG. 4. FIG. 5 is a cross-sectional view showing a combination of an assembly of MicroMounts™ and an assembly of MicroMate™ interconnect assemblies.

In one preferred embodiment of the invention, the substrates 102 are joined to the external passageways 107 by welds at a port 108. This weld between the substrate and the tube may also be used as an indexing point that may be used to locate one substrate from another. In an alternative embodiment, these connections may be made without a weld using press-fit hardware.

Figure 6:
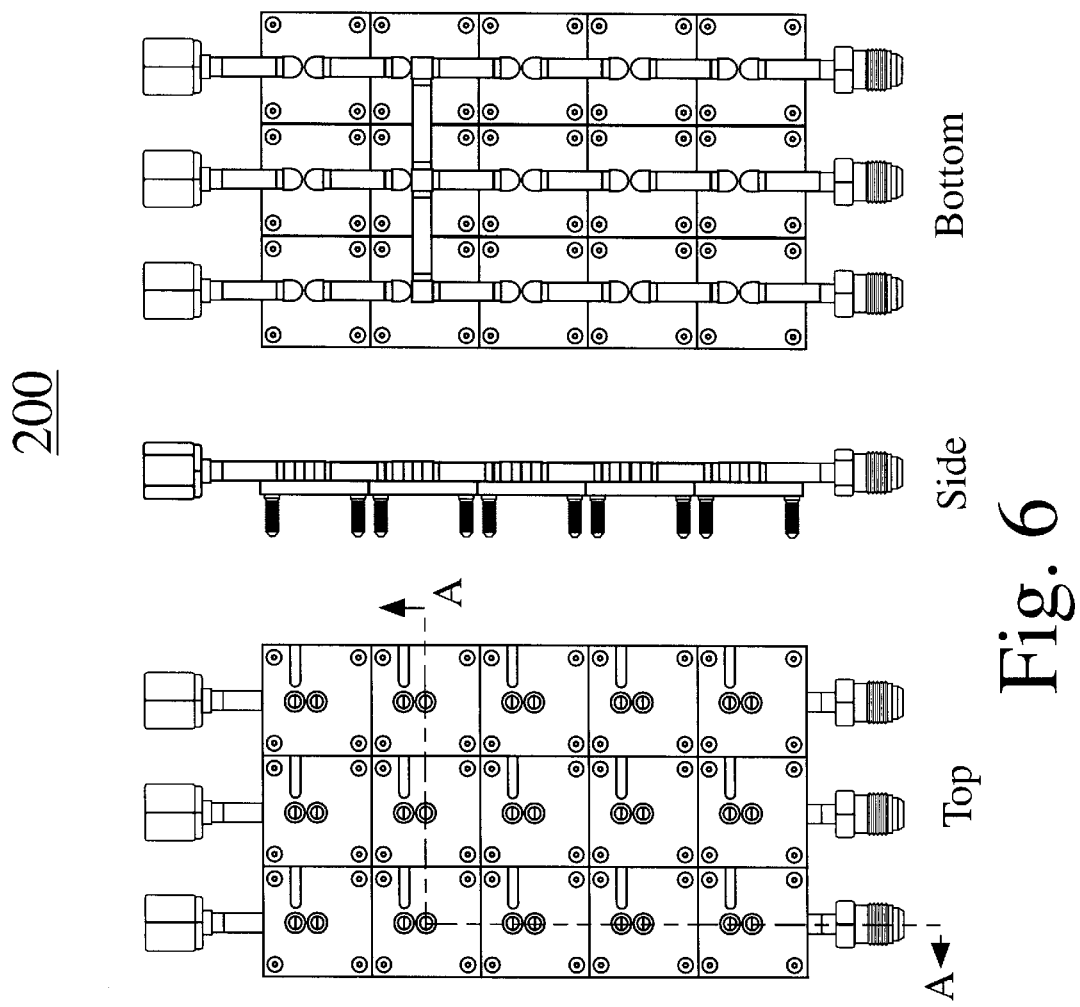

FIG. 6 furnishes top, side and bottom views of the same combination.

Figure 7:
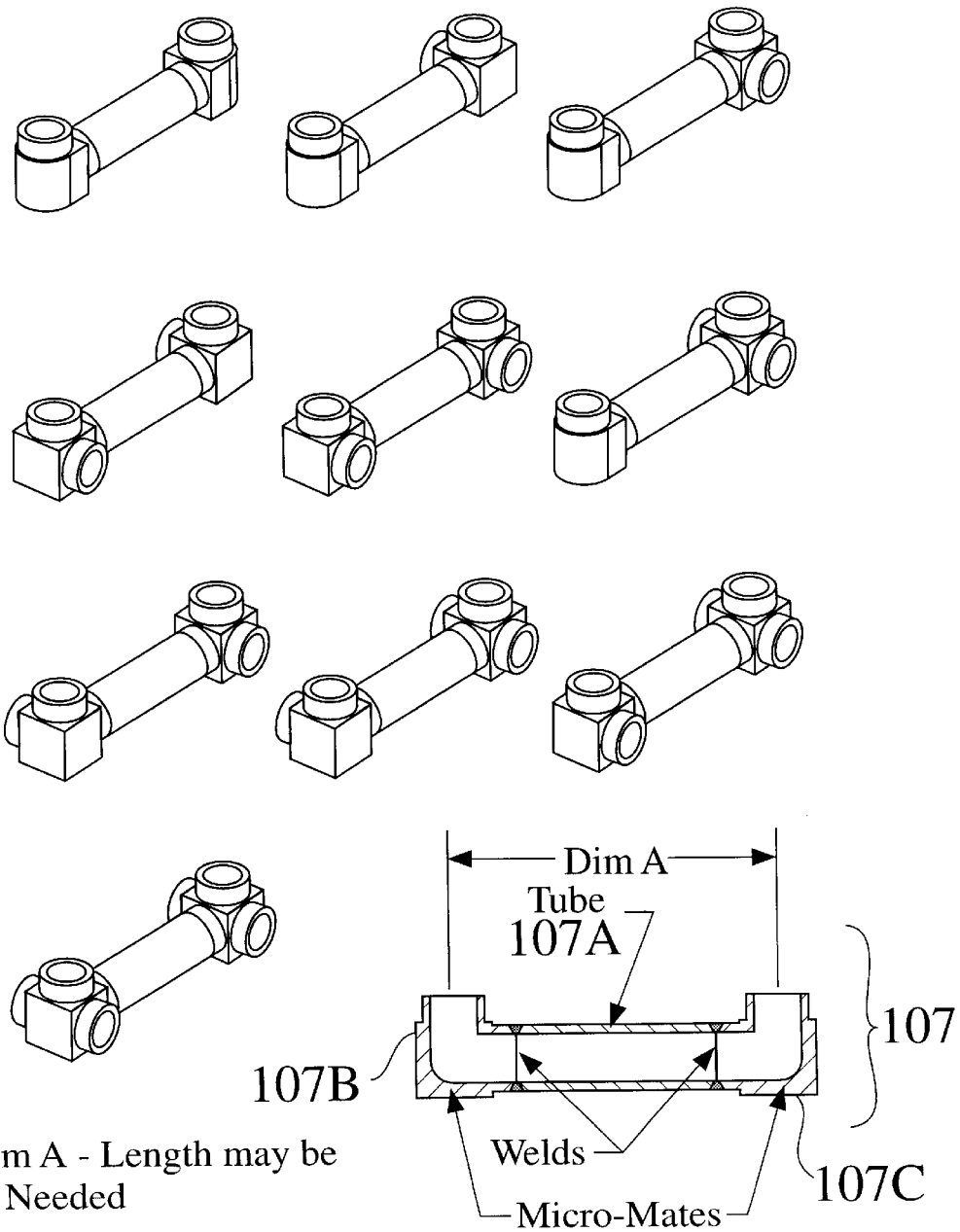

FIG. 7 supplies additional views of MicroMate™ assemblies which each use different MicroMate configurations. An external tube 107A is shown welded to two MicroMate elbows at either end of the tube.

FIG. 8 shows two MicroMounts joined together side-by-side.

Figure 9:
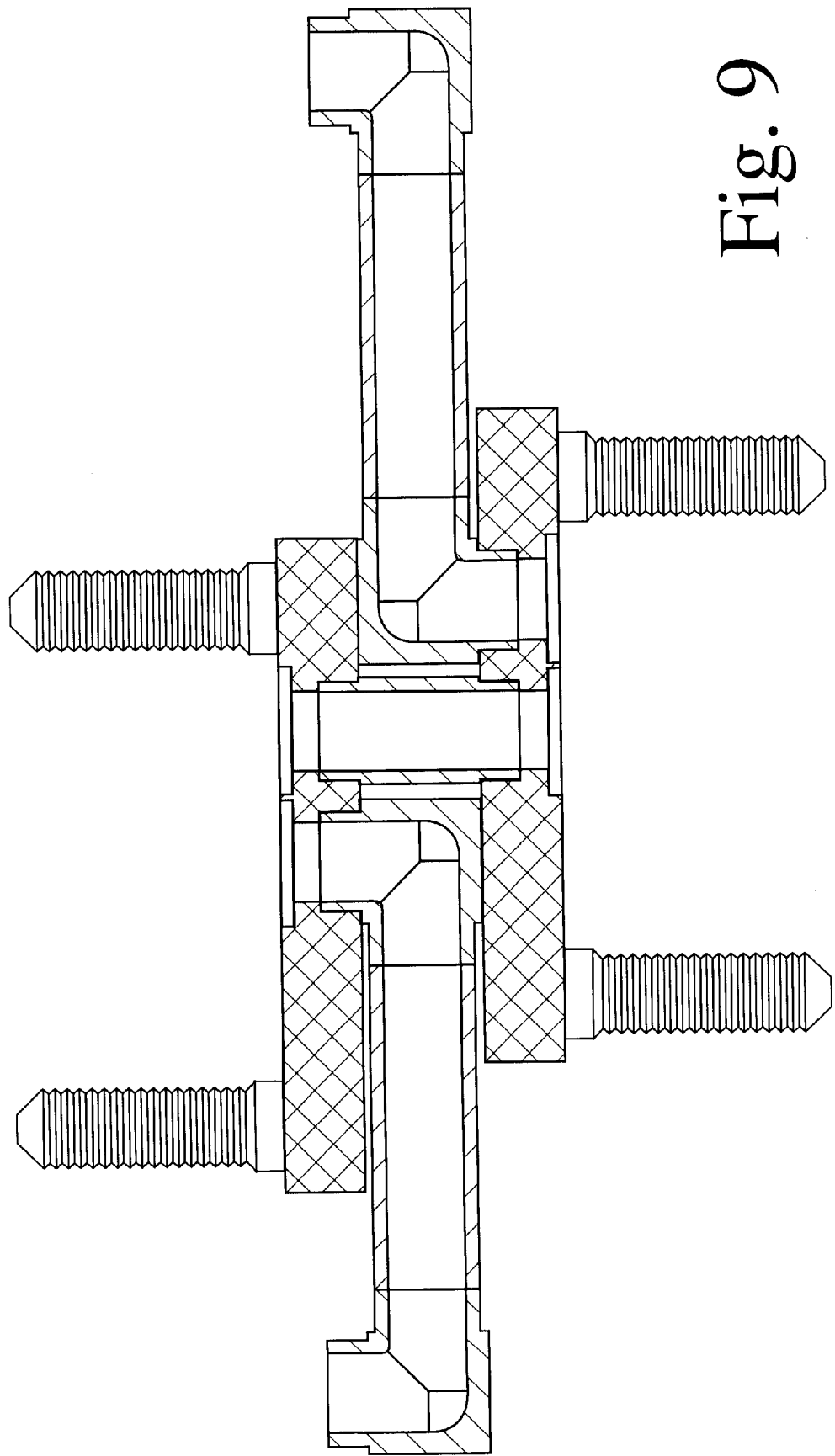

FIGS. 9 and 10 offer single-sided and double-sided cross sectional views of MicroMounts™ coupled to MicroMates™. FIGS. 10, 11, 12 and 13 provide views of MicroMount™ Systems, which generally comprise a wafer, a MicroMate Interconnection Assembly and the self-aligning posts 110.

Figure 14:
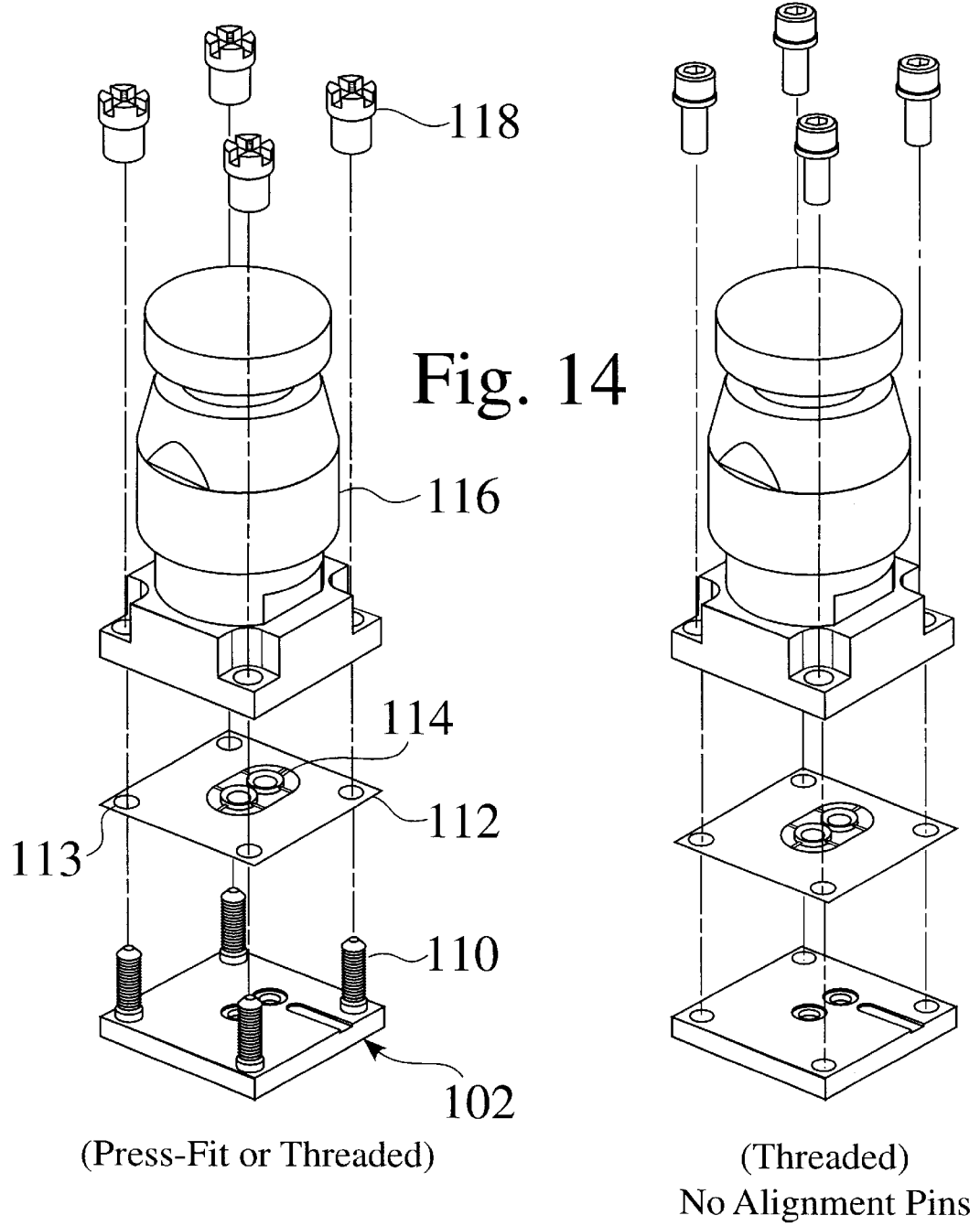

FIG. 14 reveals exploded views of MicroMounts™ with external components.

Figure 15:
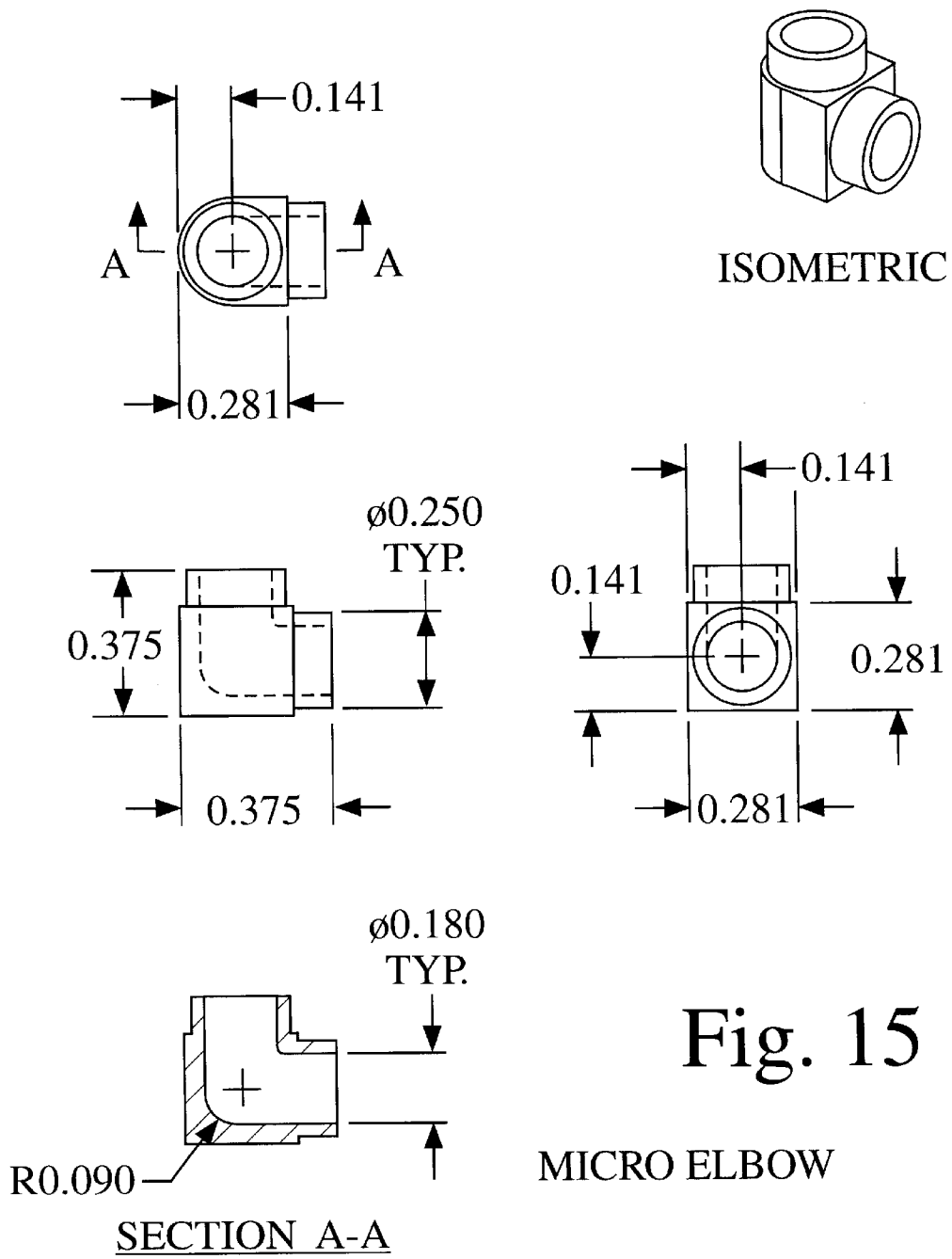
Figure 16:
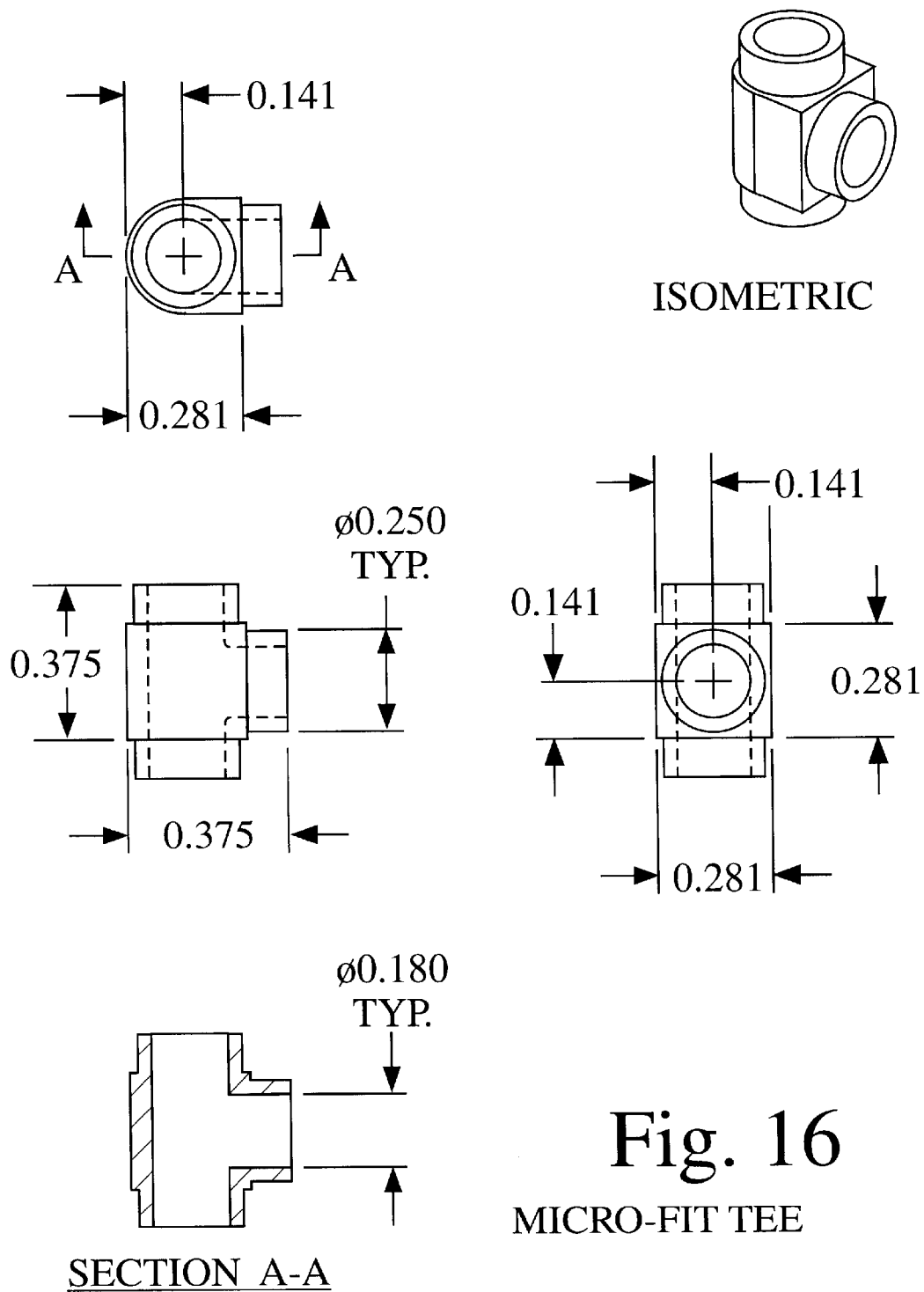
Figure 17:
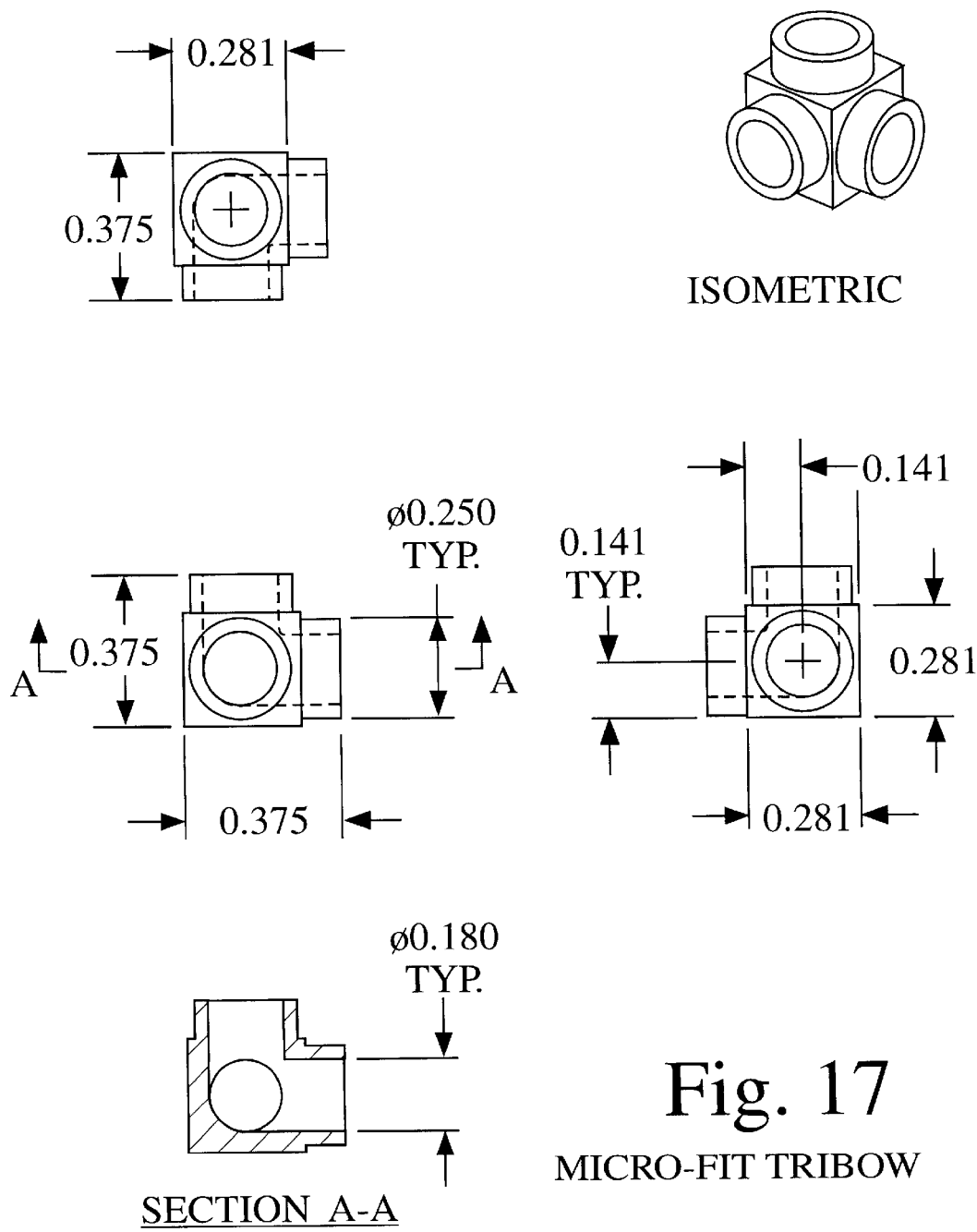
Figure 18:
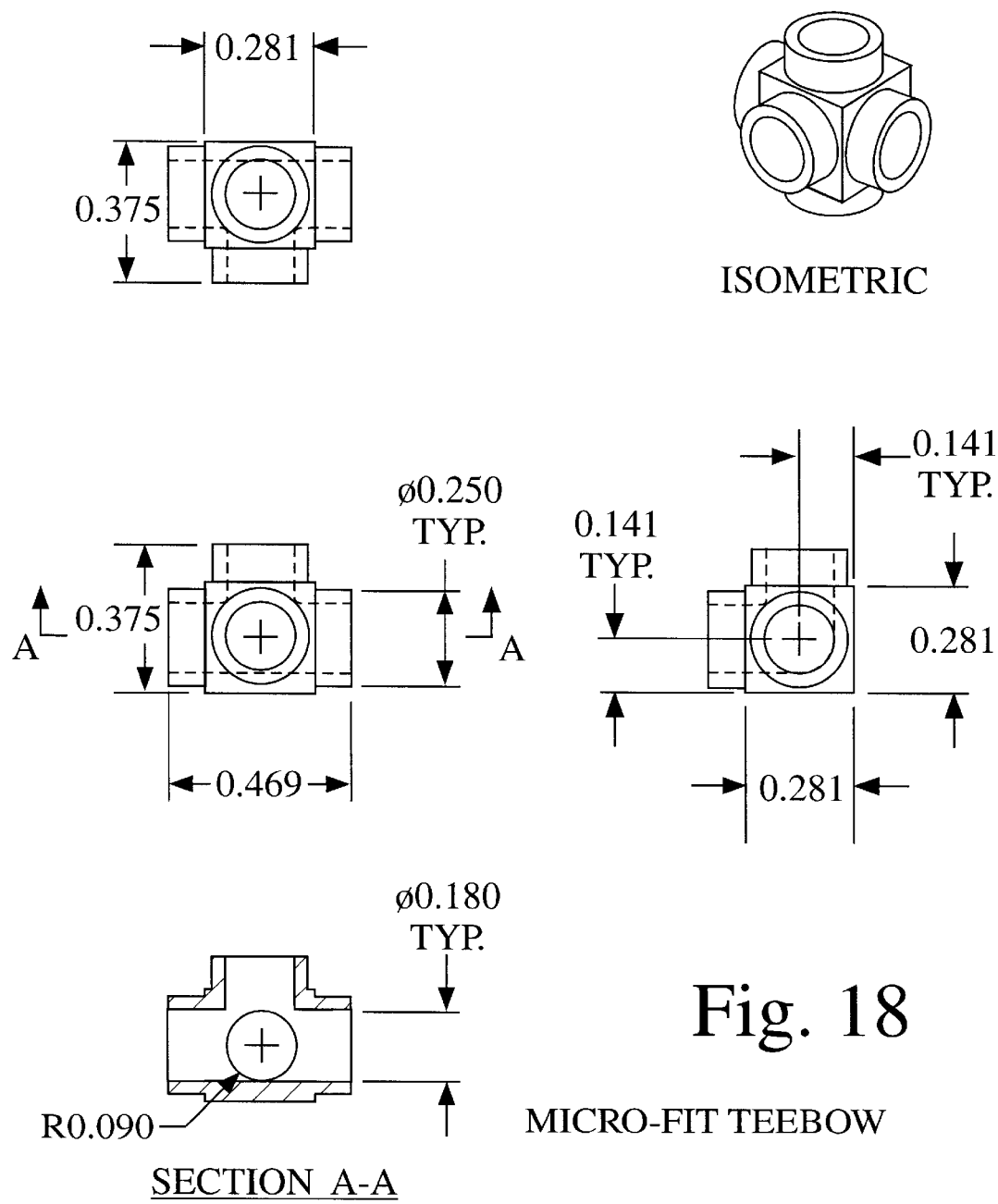
Figure 19:
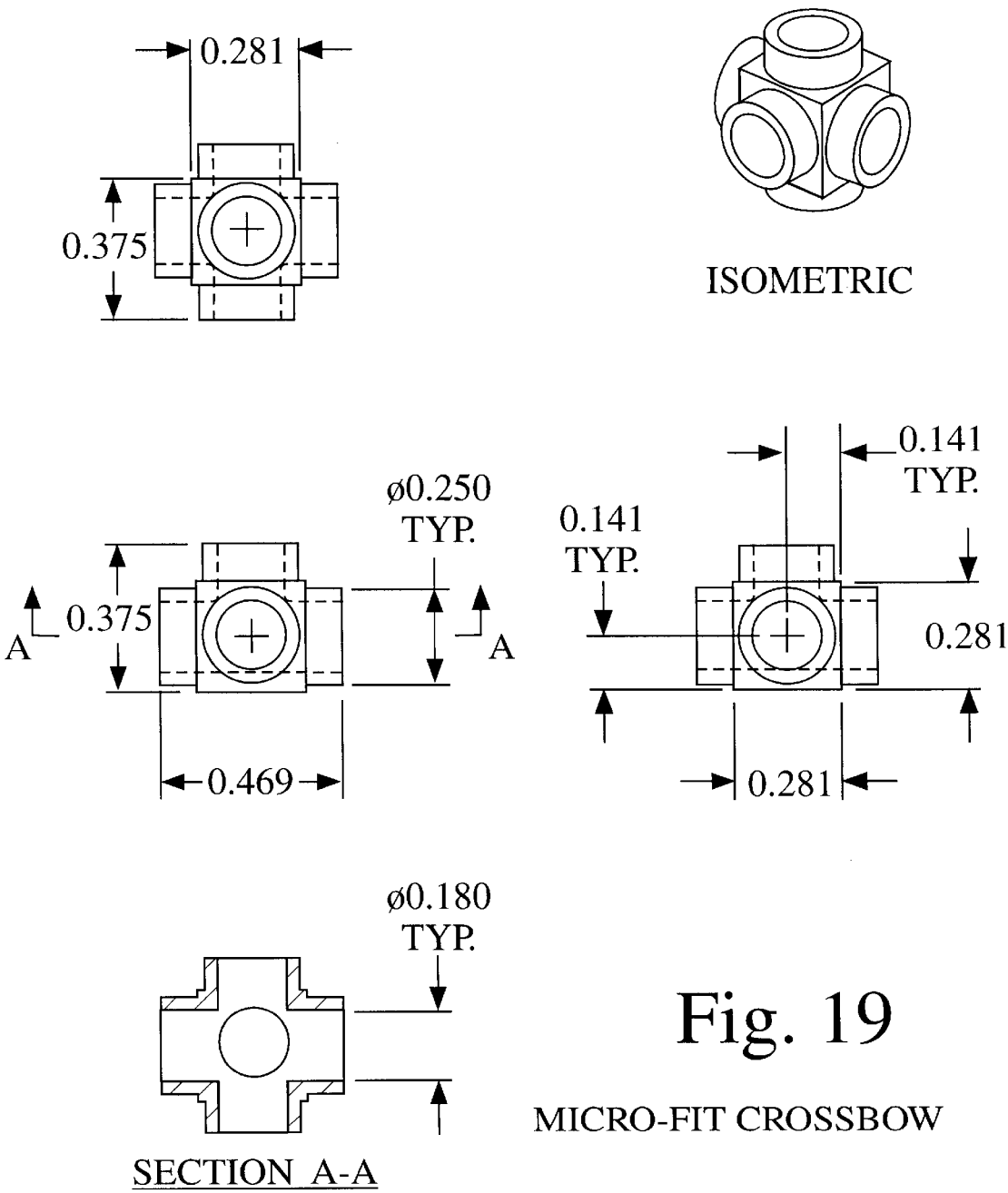

FIG. 15 supplies views of MicroMate™ elbows. FIG. 16 supplies views of MicroMate™ tees. FIG. 19 supplies views of MicroMate™ tribows. FIG. 18 supplies views of MicroMate™ teebows. FIG. 19 supplies views of MicroMate™ crossbows.

Figure 23:
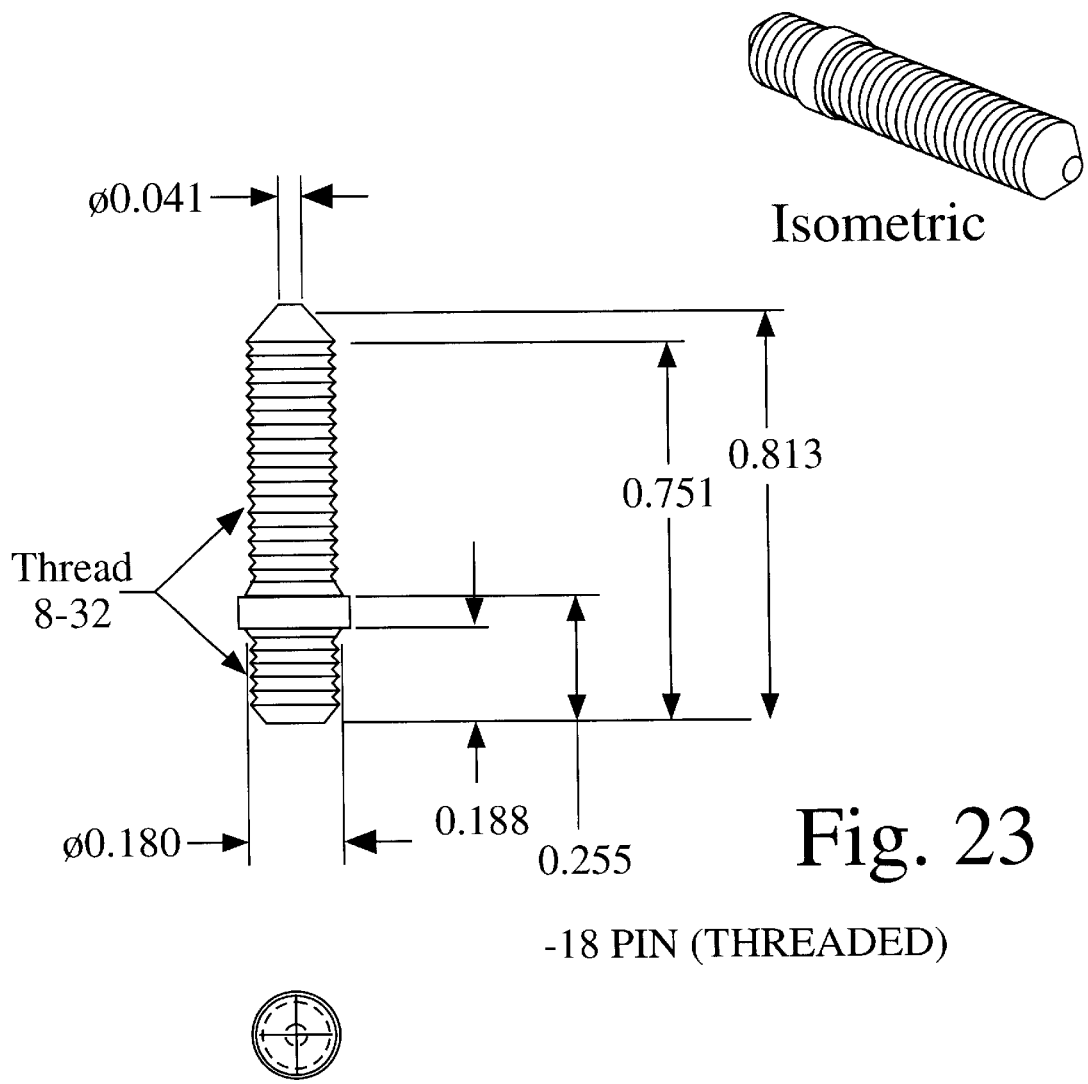
Figure 24:
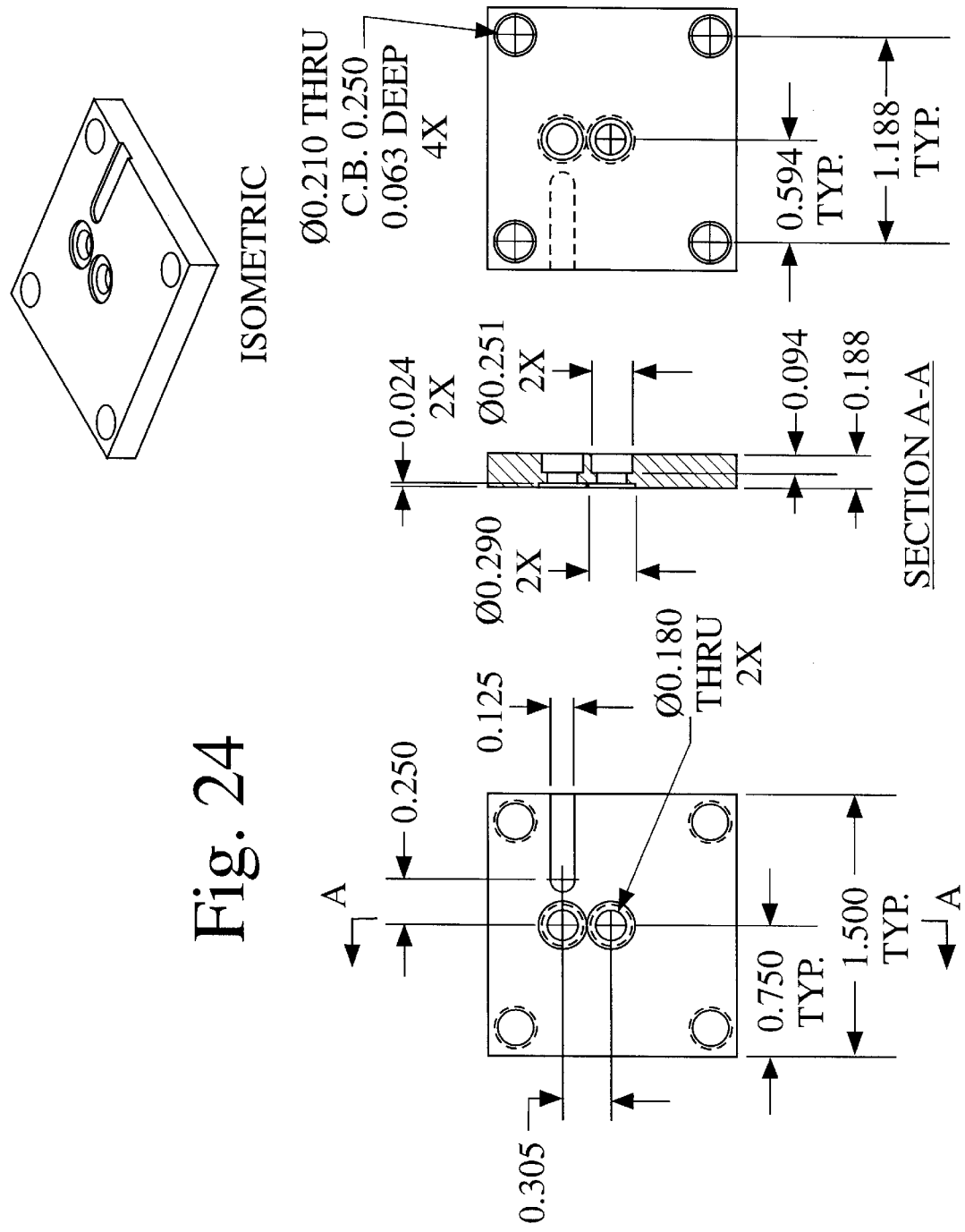
Figure 25:
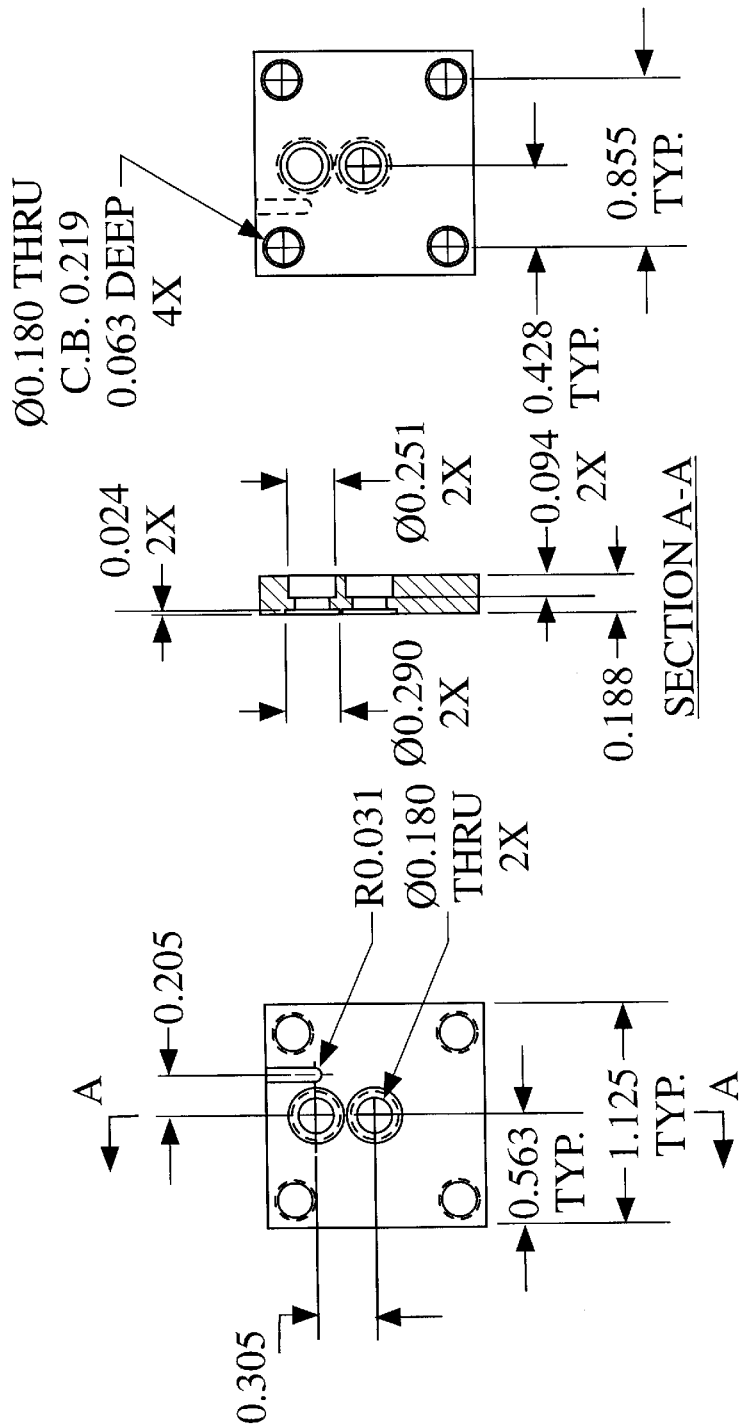
Figure 26:
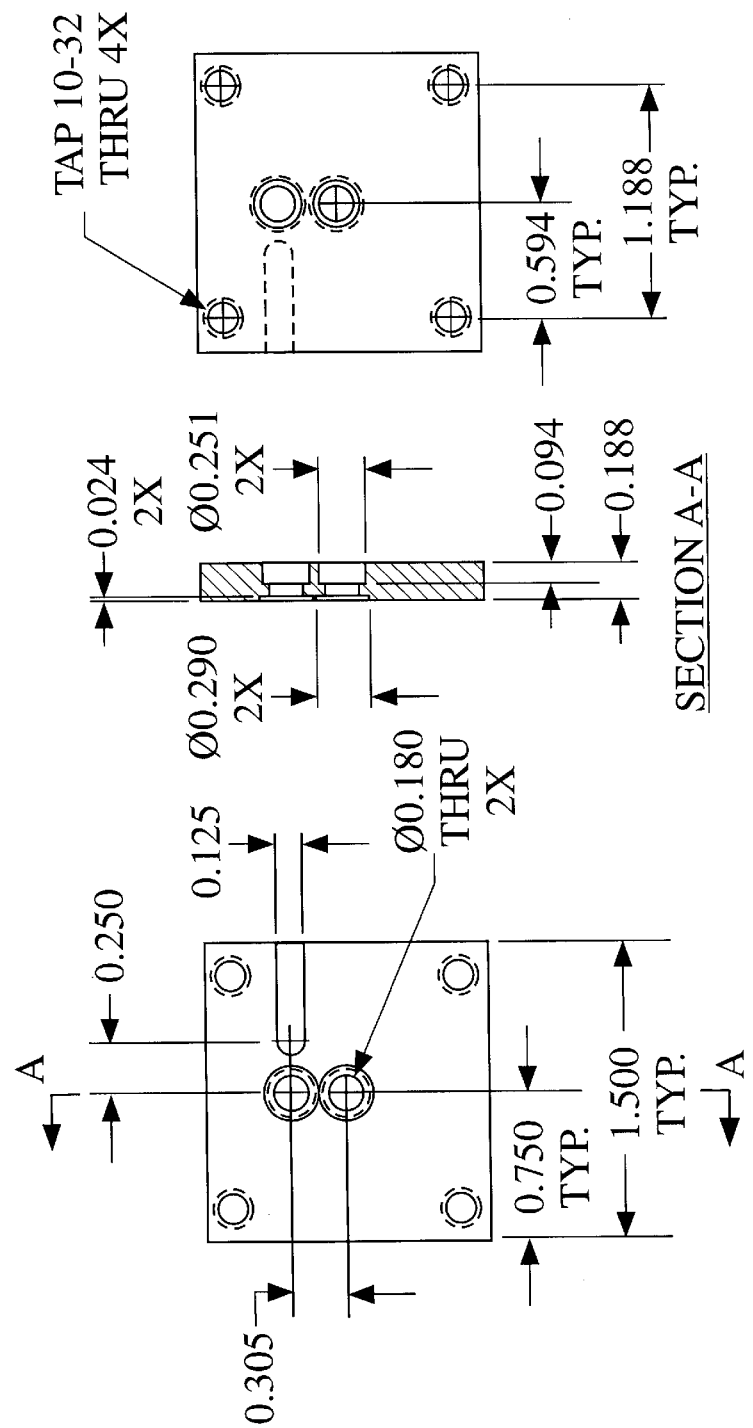

FIGS. 20 and 21 offer views of press-fit pins. FIGS. 22 and 23 offer views of threaded pins. FIGS. 24 and 25 reveal views of receptacles that accept press-fit pins. FIG. 26 provides views of receptacles that accept threaded pins.

Figure 27:
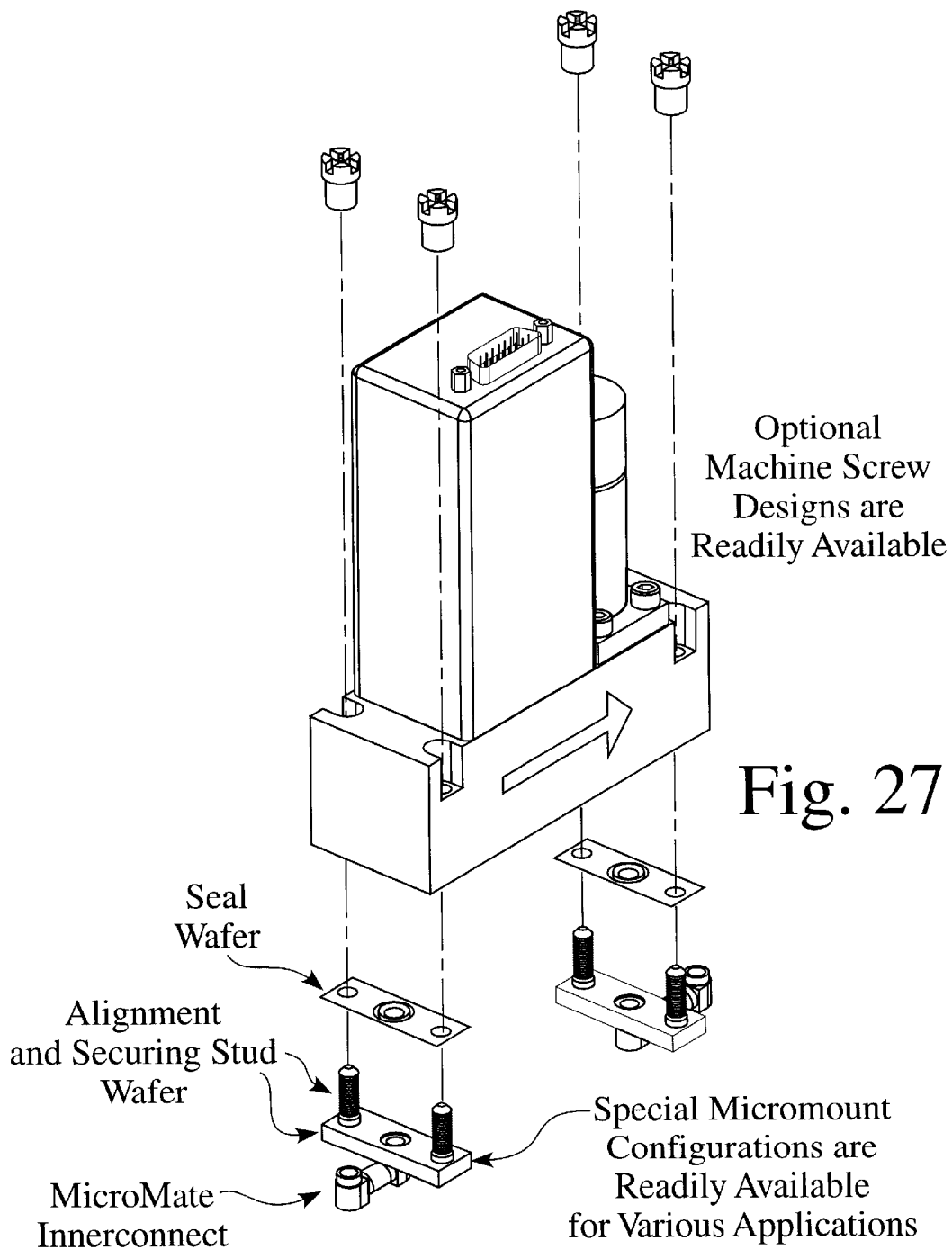

FIG. 27 offers a view of MicroMount™ Systems combined with a mass flow controller. The MicroMount™ is essentially divided into two units. Many other configurations may be employed to provide a highly flexible design.

FIG. 28 supplies a view of two MicroMount™ Systems. One of the wafers has a 1.5 inch dimension, while the other measures 1.125 inches.

Figure 29:
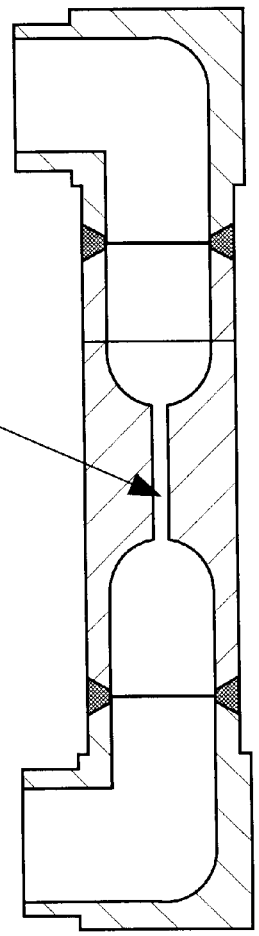

FIG. 29 furnishes a view of a MicroMount™ System that has been configured as a flow restrictor. The orifice which forms the restrictor can readily be machined into the tubular link between the MicroMate™ fittings.

Figure 30:
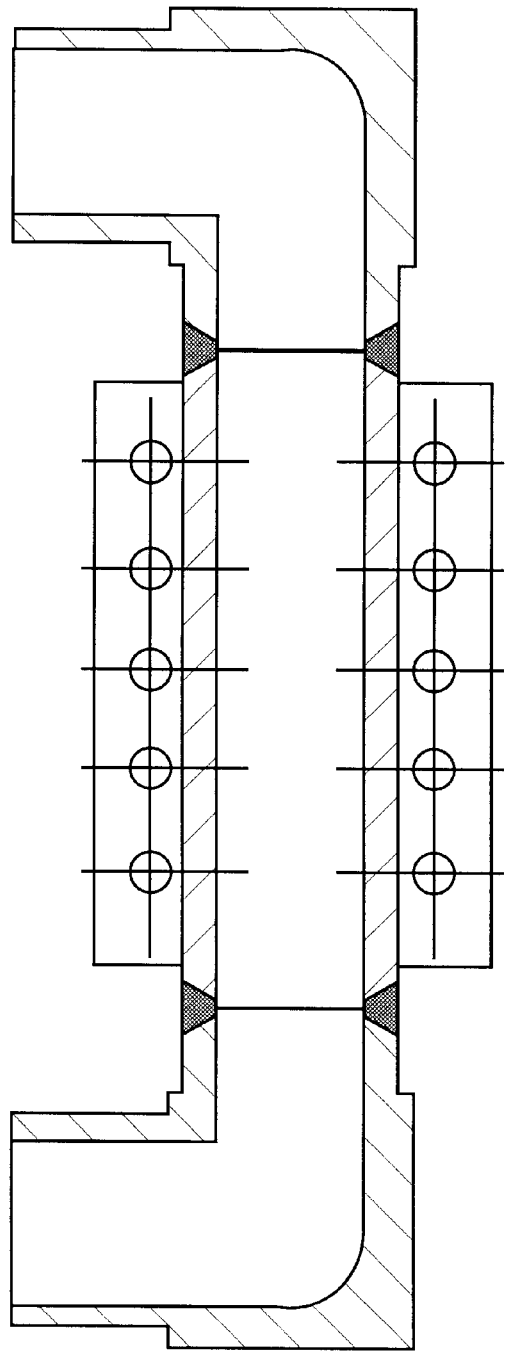

FIG. 30 reveals yet another alternative embodiment of the invention, which includes heating elements.

Figure 31:
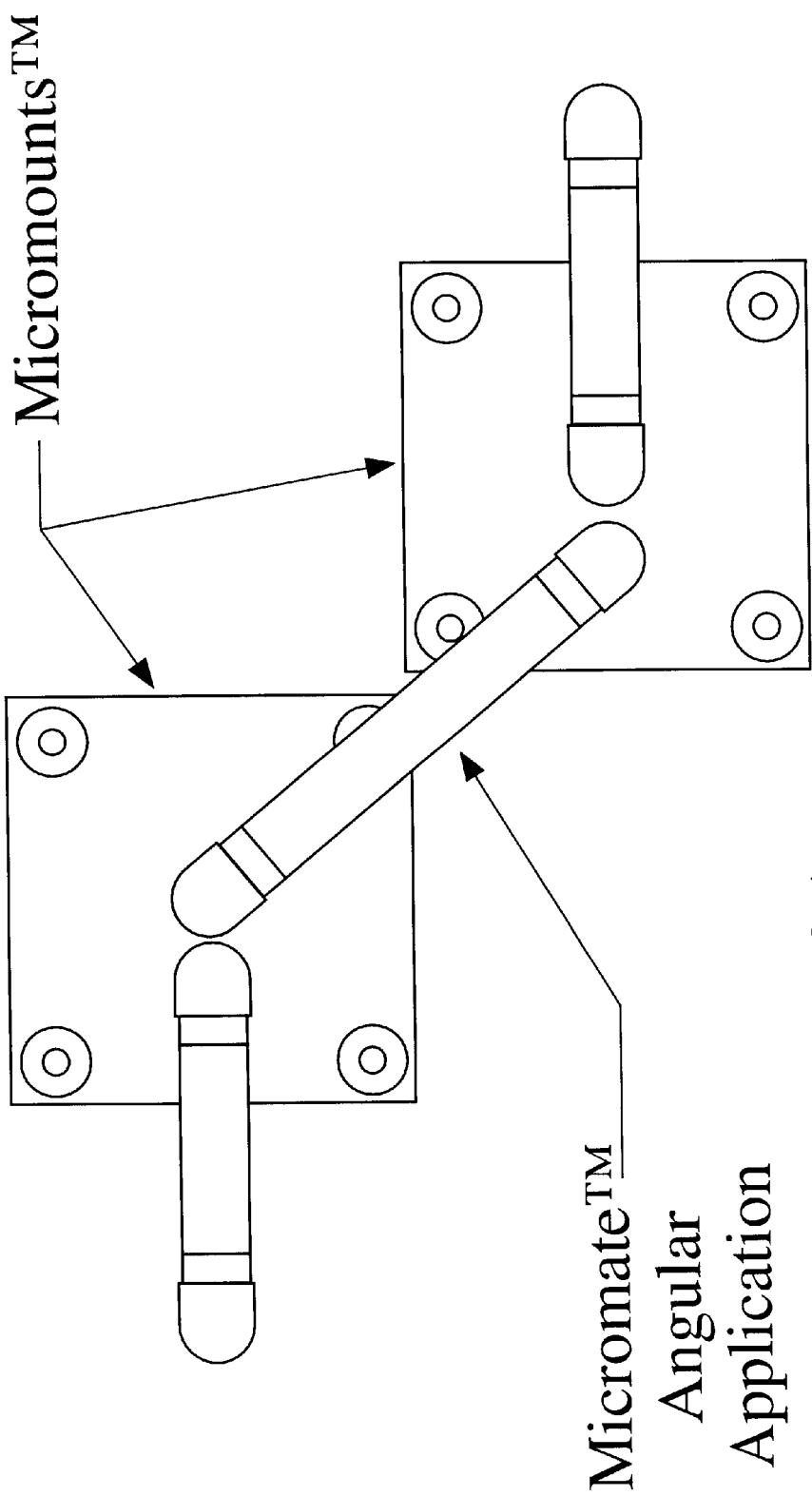

FIG. 31 presents a view of two MicroMounts joined in an angular configuration.

Figure 32:
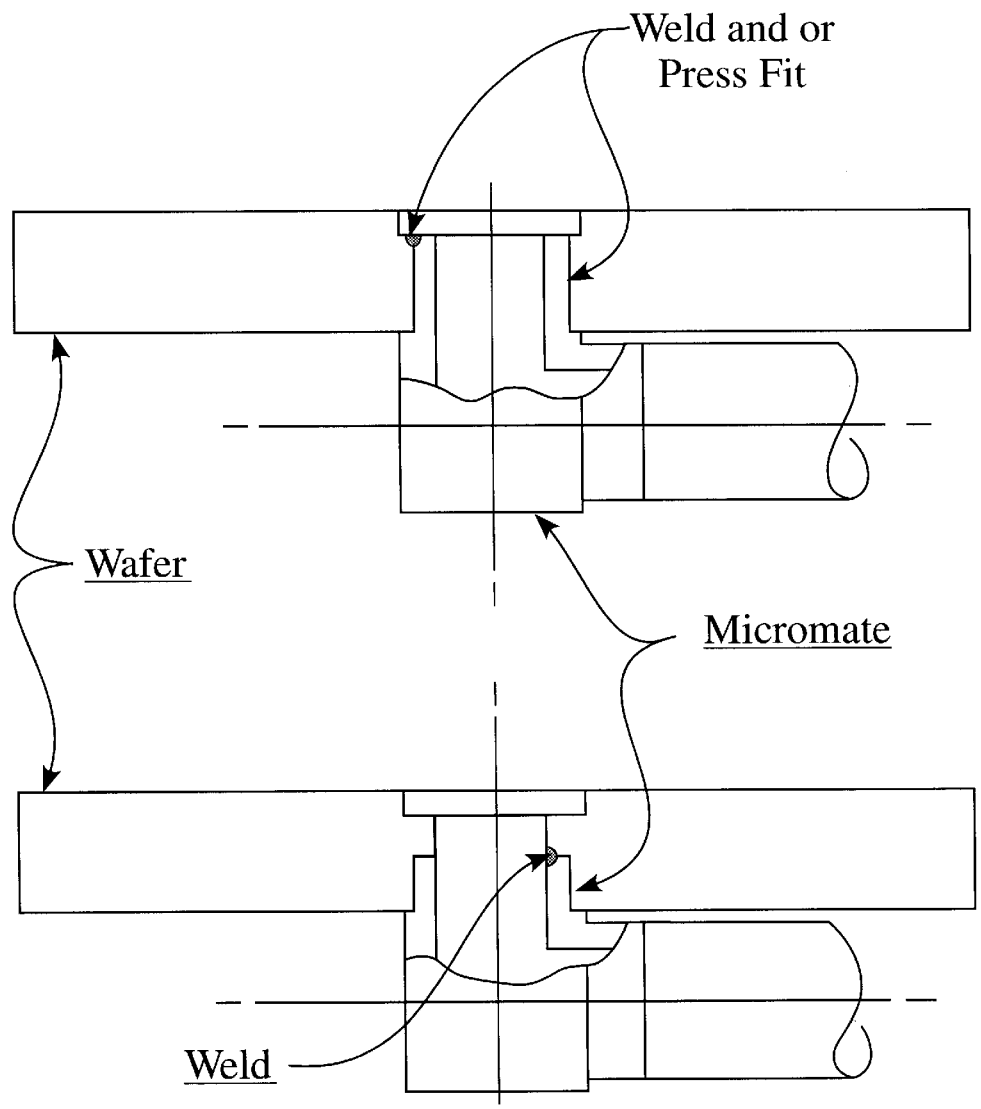

Optional joining methods are portrayed in FIG. 32. The MicroMounts™ may be joined using welds and/or press fits.

Figure 33:
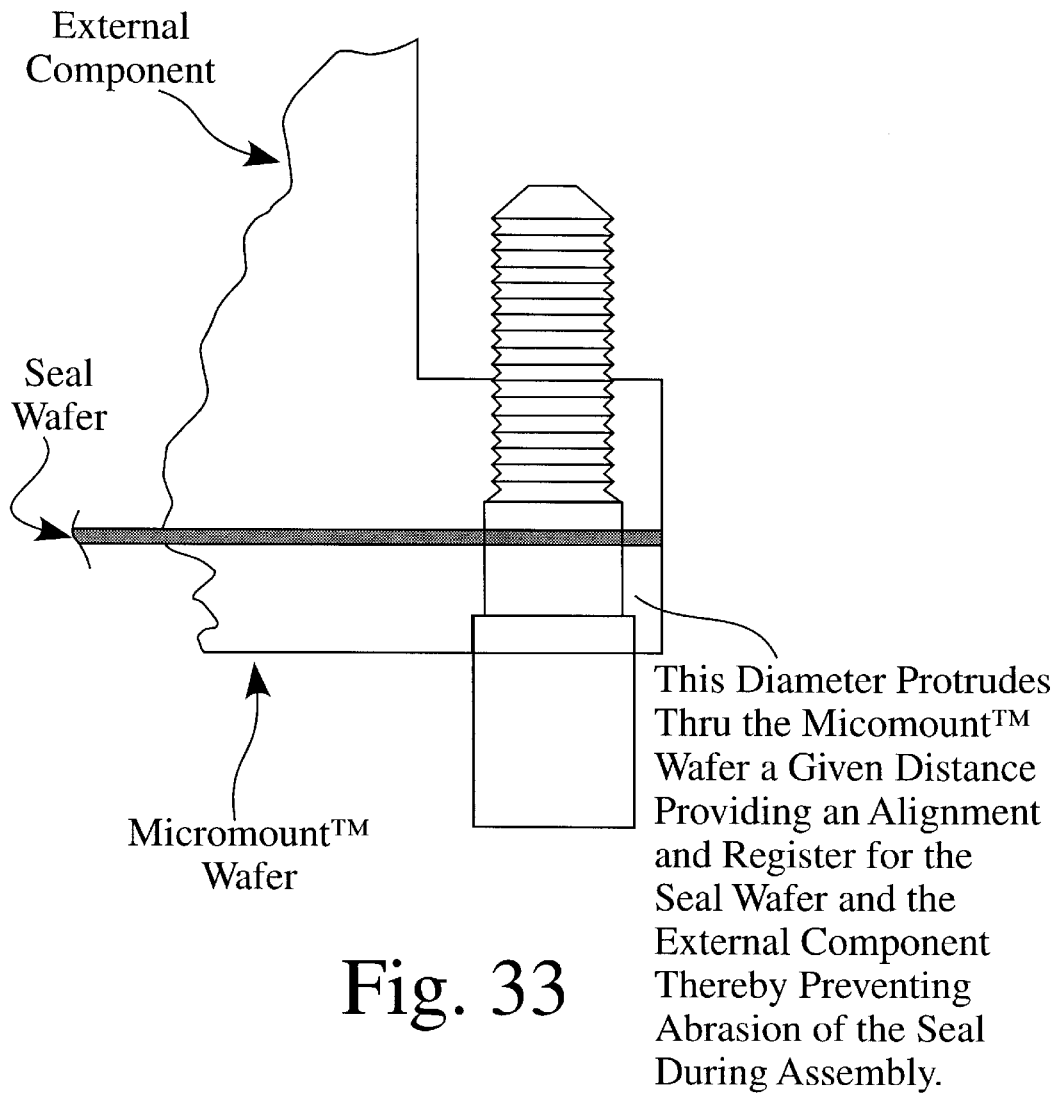
Figure 34:
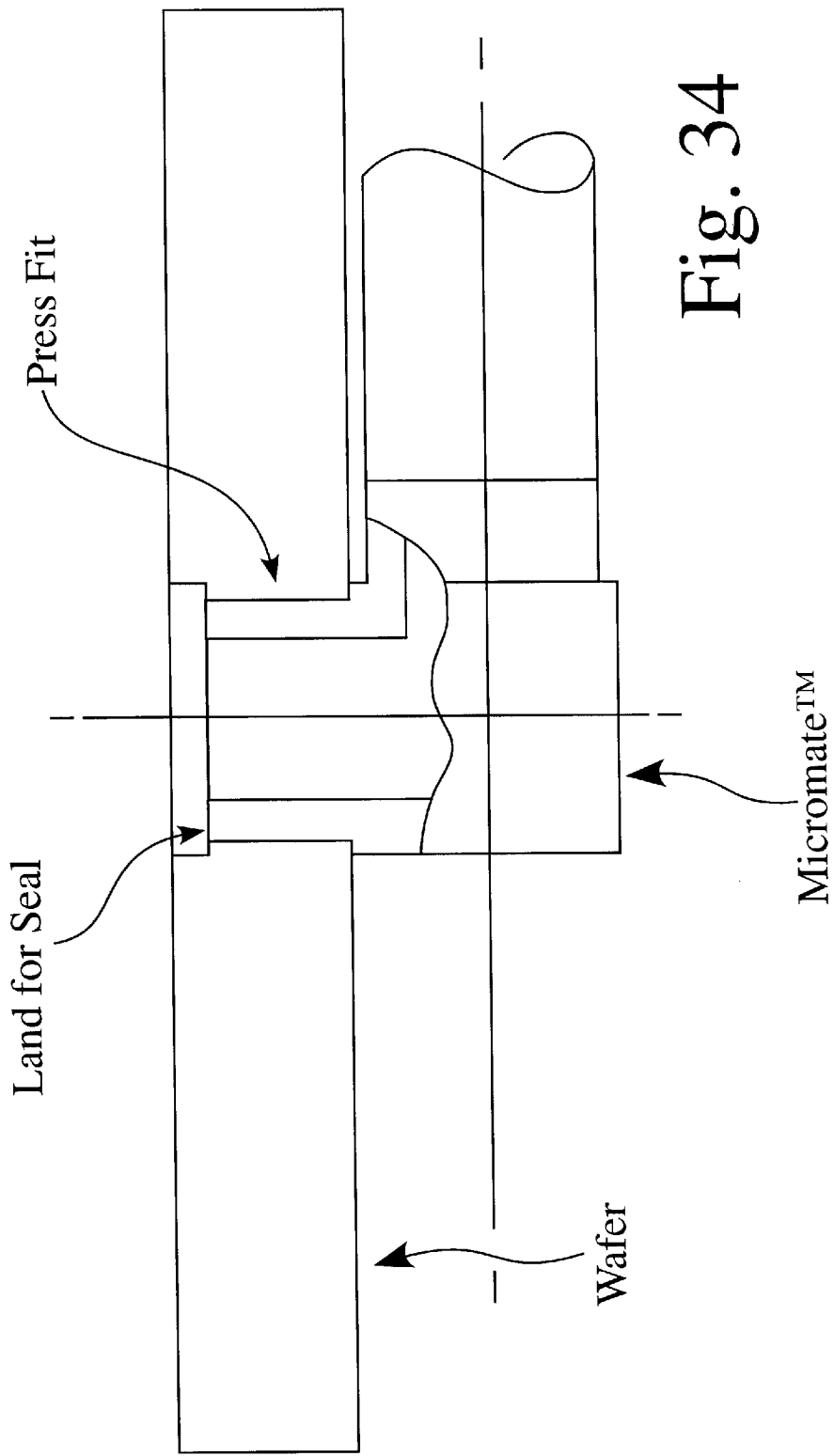
FIG. 34 illustrates optional joining methods.

FIG. 33 reveals additional details of the alignment stud and the wafer. The portion of the stud which extends above the upper face of the wafer is critical to quality control during fabrication. This extension lines up the seal with the wafer, keeping the seal safe from abrasion, and also lines up the external component, keeping it from coming into contact with the seal until the surfaces are essentially in a common plane with each other. The stud extension may be manufactured toany length, providing it allows room for the fastener to function. FIG. 34 illustrates optional joining methods.

Figure 35:
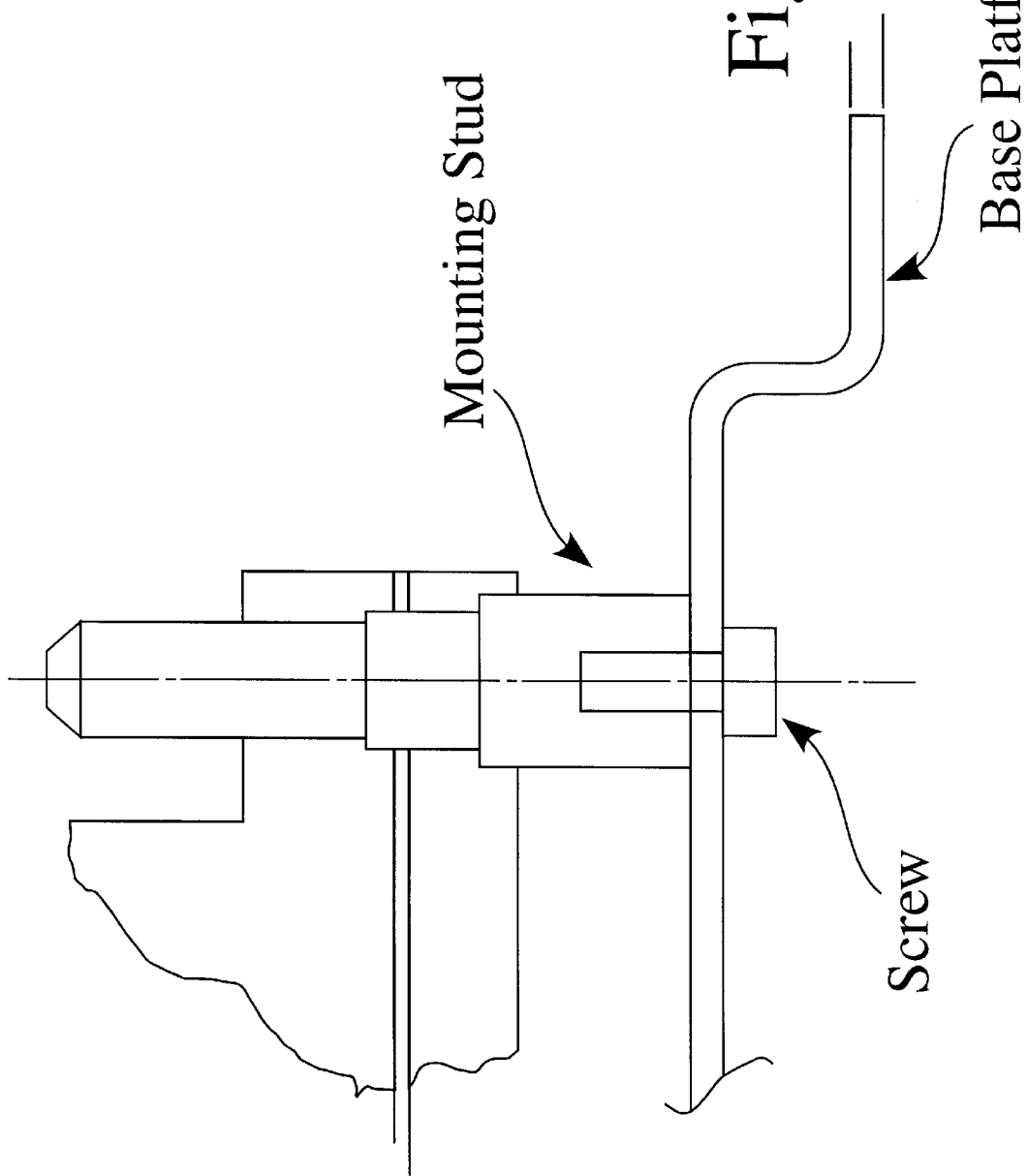
FIG. 35 is a cross-sectional view of a mounting stud and screw.

FIG. 35 is a cross-sectional view of a mounting stud and screw.

FIG. 36 reveals a combination of two MicroMounts connected by a bent tube.

FIG. 37 provides a detailed view of a tubular fluid passageway.

Although the present invention is intended for situations where it will be connected to other weldable metals such as steel, titanium, aluminum, copper, or brass. The methods and apparatus delineated in the Claims that follow may be incorporated in other non-metallic media such as plastics or ceramics.

The present invention represents a unique innovation that will be utilized in a wide variety of industrial and commercial settings that demand high quality, user worthy, precision systems.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the Claims that follow. The various couplers that have been disclosed above are intended to educate the reader about various preferred and alternative embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

100 MicroMount™ System
102 Rectilinear body, receptacle or substrate
103 Exterior side wall
104 Exterior upper wall
105 Exterior lower wall
107 MicroMate™ Interconnection Assembly
107A Tube or external passageway
107B MicroMate™ fitting
107C MicroMate™ fitting
108 Port
108C Counterbore
109 Sniffing hole for detection of leaks
110 Self-aligning post
111 Conical or rounded ends of posts
112 Foil sheet
113 Alignment holes on foil sheet
114 C-Seals
116 External component
118 Retainers

What is claimed is:

1. An apparatus comprising:
   a body means (102) for conveying a fluid;
   said body means (102) including a port means (108) for providing a weldless connection to an external component;
   said port means (108) extending through said body means (102); and
   a separate, continuous external passageway means (107) for permitting said fluid to flow between said external passageway means (107) and said port means (108); said external passageway means (107) being welded to said port means (108).

2. The apparatus as claimed in claim 1, said body means (102) further including a self-aligning projection means (110) for connecting said body means (102) to an external component.

3. An apparatus as recited in claim 1, in which said body means (102) is made from metal.

4. An apparatus as recited in claim 1, in which said body means (102) is generally rectilinear.

5. An apparatus as recited in claim 1, in which said body means (102) includes a flat exterior side wall (103).

6. An apparatus as recited in claim 1, in which
   said body means (102) includes an upper external wall (104); and
   said port means (108) is generally located in said upper external wall (104).

7. An apparatus as recited in claim 1, in which a foil sheet (112) and a seal (114) are utilized to form a leak-proof connection between said body means (102) and an external device.

8. An apparatus as recited in claim 1, in which said body means (102) is double sided.

9. An apparatus as recited in claim 1, in which said external component is one of the following group: a manual valve, a pneumatic valve, a solenoid valve, a pressure regulator, a pressure transducer, a filter, a purifier or a mass flow controller.

10. An apparatus as recited in claim 1, in which said projection means (110) is a post.

11. An apparatus as recited in claim 1, in which said projection means (110) is a pin.

12. An apparatus as recited in claim 1, in which said projection means (110) is a stud.

13. An apparatus as recited in claim 1, in which said projection means (110) includes a rounded end (111).

14. An apparatus as recited in claim 1, further comprising:
    a retainer means (118) which engages said projection means (110) to secure said body means (102) to said external component.

15. An apparatus as recited in claim 1, in which said component is characterized by dimensions which are standardized.

16. An apparatus as recited in claim 1, in which said body means (102) acts as a heat sink during welding.

17. An apparatus as recited in claim 1, in which said body means (102) and said external component are self-aligning due to the combined action of said projection means (110), said external component, and said retainer means (118).

18. An apparatus as recited in claim 1, in which said body means (102) and said component are generally leak-proof.

19. An apparatus as recited in claim 1, in which said body means (102) and said component provide a high purity conveyance for said fluid.

20. An apparatus as recited in claim 1, in which said body means (102) is configured to be compatible with SEMI-standard formats.

21. An apparatus as recited in claim 1, in which said external component is a surface mount component.

22. An apparatus as recited in claim 1, in which said external passageway means comprises a MicroMate™ Interconnection Assembly 107.

23. An apparatus as claimed in claim 22, in which said MicroMate™ Interconnection Assembly 107 includes an external tube 107A.

24. An apparatus as recited in claim 22, in which said MicroMate™ Interconnection Assembly 107 includes a MicroMate™ fitting 107B.

25. An apparatus as recited in claim 22 which includes welded connections.

26. An apparatus as recited in claim 1, in which said external passageway means (107) and said port means (108) are joined in a welded connection.

27. An apparatus as recited in claim 1, in which said external passageway means (107) and said port means (108) are joined in a weldless connection.

28. An apparatus as claimed in claim 26, in which said welded connection is used as an indexing point to locate one body (102) from another.

29. An apparatus as recited in claim 1, in which said external passageway means (107) is rotated from said body means (102).

30. An apparatus as claimed in claim 1, in which a plurality of body means (102) are connected to a plurality of external passageway means (107) to form a planar array (200).

31. An apparatus as claimed in claim 30, in which two of said body means (102) in said plurality of body means (102) touch.

32. An apparatus as claimed in claim 1, in which a plurality of planar arrays (200) are assembled to form a multi-planar array (202).

33. An apparatus as claimed in claim 1, in which said body means (102) is integrated into a common plate.

34. An apparatus as claimed in claim 1, in which said body means (102) utilizes a one and one eighth inch surface mount configuration.

35. An apparatus as claimed in claim 1, in which said body means (102) utilizes a one and one half inch surface mount configuration.

36. An apparatus as claimed in claim 1, in which said body means (102) is single-mounted.

37. An apparatus as claimed in claim 1, in which said body means (102) is double-mounted.

38. An apparatus as claimed in claim 1, in which a plurality of said body means (102) are connected using said external tube 107A.

39. An apparatus as claimed in claim 1, in which a plurality of said body means (102) are used to house an installed device.

40. An apparatus comprising:

a generally rectilinear body (102);

said generally rectilinear body (102) having a plurality of exterior side walls (103);

a sheet.(112); said sheet (112) including a seal (114) and a plurality of alignment holes (113);

one of said exterior walls (104) having a port (108); said port (108) being configured to mate with an external component together with said seal (114) surrounded by said sheet (112);

said generally rectilinear body (102) having a separate, continuous external passageway (107); said external passageway (107) being in communication with and welded to said port (108); and said generally rectilinear body (102) also having a plurality of posts (110) for automatically aligning and connecting said external component with said body (102); said posts (110) including a conical end (111).

41. A method comprising the steps of:

providing a generally rectilinear body (102);

forming a port (108) in said body (102);

welding an external passageway means (107) to said port (108);

providing a plurality of posts (110) on said body (102);

providing a sheet (112) having a plurality of alignment holes (113) and a seal (114);

attaching an external component to said generally rectilinear body (102) by inserting said plurality of posts (110) through said plurality of alignment holes (113) in said sheet (112) and then engaging said plurality of posts (110) with an external component; and affixing said external component to said generally rectilinear body (102) using said plurality of posts (110).

42. An apparatus as recited in claim 1, further comprising a mass flow controller.

43. An apparatus as recited in claim 1, further comprising an additional wafer having a different dimension.

44. An apparatus as recited in claim 1, further comprising a flow restrictor.

45. An apparatus as recited in claim 1, further comprising a heating element.

46. An apparatus as recited in claim 43, in which said wafers are connected in an angular configuration.

47. An apparatus as recited in claim 1, in which welded connections are employed.

48. An apparatus as recited in claim 1, in which press fit connections are employed.

* * * * *